US012737295B2

(12) United States Patent
Oh et al.

(10) Patent No.: US 12,737,295 B2
(45) Date of Patent: Sep. 15, 2026

(54) STORAGE CONTROLLER AND OPERATING METHOD OF THE STORAGE CONTROLLER

(71) Applicant: Samsung Electronics Co., Ltd., Suwon-si (KR)

(72) Inventors: Minsik Oh, Suwon-si (KR); Donggil Kang, Suwon-si (KR); Kyungjune Cho, Suwon-si (KR); Jongmin Kim, Suwon-si (KR); Jinwoo Song, Suwon-si (KR); Kyungsik Um, Suwon-si (KR); Myunggwan Jeong, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 154 days.

(21) Appl. No.: 18/502,233

(22) Filed: Nov. 6, 2023

(65) Prior Publication Data

US 2024/0311304 A1 Sep. 19, 2024

(30) Foreign Application Priority Data

Mar. 15, 2023 (KR) ........................ 10-2023-0034170

(51) Int. Cl.
*G06F 12/0815* (2016.01)
*G06F 12/0862* (2016.01)

(52) U.S. Cl.
CPC ...... *G06F 12/0815* (2013.01); *G06F 12/0862* (2013.01)

(58) Field of Classification Search
CPC ......................... G06F 12/0815; G06F 12/0862
See application file for complete search history.

(56) References Cited

U.S. PATENT DOCUMENTS 7,679,133 B2 3/2010 Son et al.
8,478,942 B2 7/2013 Conway
8,553,466 B2 10/2013 Han et al.
8,559,235 B2 10/2013 Yoon et al.
(Continued)

FOREIGN PATENT DOCUMENTS

KR 101731006 B1 4/2017
KR 102151180 B1 9/2020

OTHER PUBLICATIONS

Extended European Search Report for corresponding European Patent Application No. 23211969.3 mailed on Apr. 15, 2024.

*Primary Examiner* — Prasith Thammavong
(74) *Attorney, Agent, or Firm* — HARNESS, DICKEY & PIERCE, P.L.C.

(57) ABSTRACT

A storage controller includes a host interface configured to communicate with a host, a buffer memory configured to buffer data read from a non-volatile memory, a cache memory including a plurality of cache lines and configured to store the data in at least one of the plurality of cache lines, and a cache controller configured to manage a status bitmap. The status bitmap indicates priority information of the plurality of cache lines according to an operation corresponding to a request received from the host interface, and the cache controller is further configured to select a victim cache line, among the plurality of cache lines, to be replaced based on the status bitmap. In this case, the operation corresponding to the request corresponds to one of normal read, prefetch, read-after-read, and read-after-prefetch.

16 Claims, 16 Drawing Sheets

(56) References Cited

U.S. PATENT DOCUMENTS

| | | | | |
|---|---|---|---|---|
| 8,654,587 | B2 | 2/2014 | Yoon et al. | |
| 10,649,901 | B2 | 5/2020 | Drerup et al. | |
| 10,963,392 | B1 | 3/2021 | Gupta et al. | |
| 11,023,376 | B2 | 6/2021 | Hagersten | |
| 2006/0090036 | A1 | 4/2006 | Zohar et al. | |
| 2007/0094450 | A1 | 4/2007 | VanderWiel | |
| 2011/0233648 | A1 | 9/2011 | Seol et al. | |
| 2012/0226871 | A1* | 9/2012 | Cantin | G06F 12/123 711/135 |
| 2014/0173214 | A1 | 6/2014 | Ramrakhyani et al. | |
| 2015/0067266 | A1* | 3/2015 | Jafri | G06F 12/0804 711/136 |
| 2016/0062899 | A1* | 3/2016 | Cain, III | G06F 9/4843 711/125 |
| 2017/0300418 | A1* | 10/2017 | Reed | G06F 12/128 |
| 2019/0235762 | A1 | 8/2019 | Kaburaki et al. | |
| 2020/0379922 | A1* | 12/2020 | Kumar | G06F 12/1483 |

* cited by examiner

Figure 2:
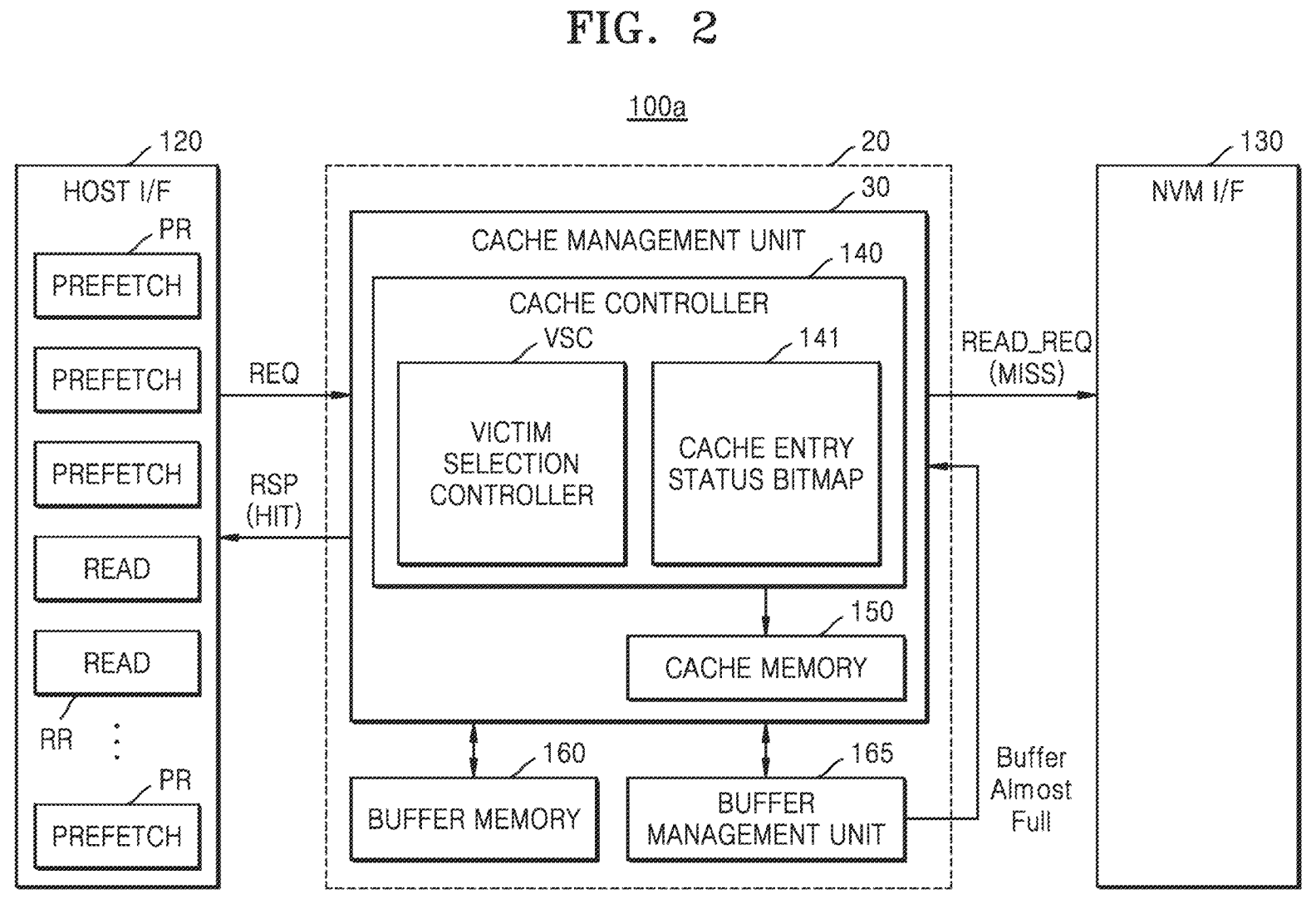

HOST I/F 120
PR
PREFETCH
PREFETCH
PREFETCH
READ
READ
RR
PR
PREFETCH

REQ
RSP (HIT)

20
30
CACHE MANAGEMENT UNIT
140
CACHE CONTROLLER
VSC
VICTIM SELECTION CONTROLLER
141
CACHE ENTRY STATUS BITMAP
150
CACHE MEMORY
165
BUFFER MANAGEMENT UNIT
160
BUFFER MEMORY

READ_REQ (MISS)
Buffer Almost Full

130
NVM I/F

Figure 3:
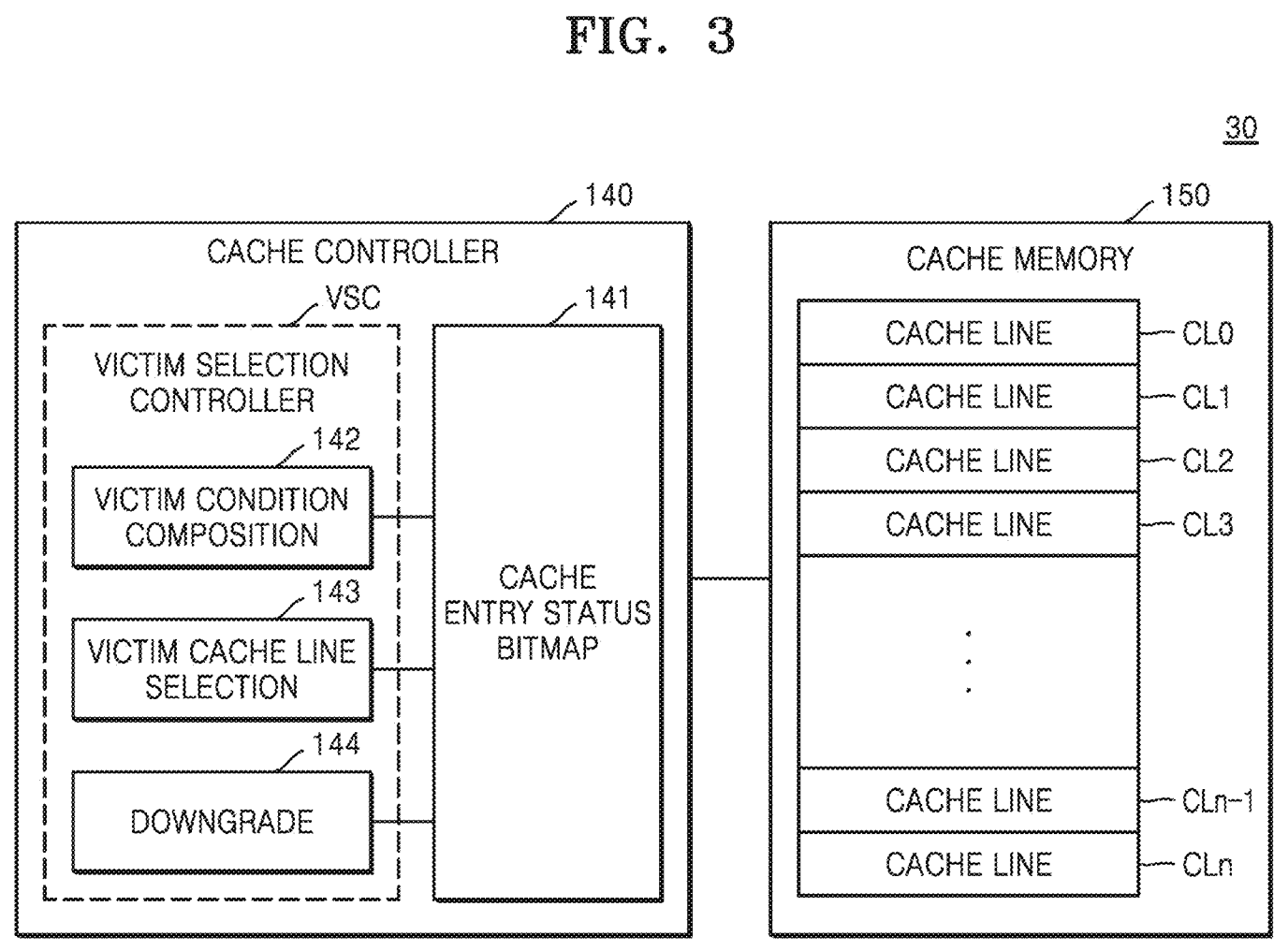

150
CACHE MEMORY
CL0 CACHE LINE
CL1 CACHE LINE
CL2 CACHE LINE
CL3 CACHE LINE
. . .
CLn-1 CACHE LINE
CLn CACHE LINE

140
CACHE CONTROLLER
141
CACHE ENTRY STATUS BITMAP
VSC
VICTIM SELECTION CONTROLLER
142
VICTIM CONDITION COMPOSITION
143
VICTIM CACHE LINE SELECTION
144
DOWNGRADE

140
CACHE CONTROLLER
141
VIC
REQ
ENTRY
VALID
PROMOTION
PREFETCH
DONE
0
1
2
3
4
N
41
42
43
44
PTR_PREV
DOWNGRADE
PTR_CURR
ID_VIC
(VICTIM CACHE ENTRY INDEX)
150
CACHE MEMORY
CE0
CE1
CE2
CE3
CE3
CEn

SERVICE_DONE (CACHE ENTRY INDEX)
140
141
CACHE CONTROLLER
ENTRY
VALID
PROMOTION
PREFETCH
DONE
0
1
2
3
4
...
N
41
42
43
44

STORAGE CONTROLLER AND OPERATING METHOD OF THE STORAGE CONTROLLER

CROSS-REFERENCE TO RELATED APPLICATION

This application is based on and claims priority under 35 U.S.C. § 119 to Korean Patent Application No. 10-2023-0034170, filed on Mar. 15, 2023, in the Korean Intellectual Property Office, the disclosure of which is incorporated by reference herein in its entirety.

BACKGROUND

The inventive concepts relate to a memory device, and more particularly, a storage controller that controls non-volatile memory, a storage device including the storage controller, and an operating method of the storage controller.

A storage device may include non-volatile memory and a storage controller, and the storage controller may include cache memory. When data corresponding to a read request received from a host is stored in the cache memory, a cache hit may occur and the data may be rapidly transmitted to the host. As the cache memory stores more data to be accessed, the cache hit ratio may increase, and accordingly, the operating speed of the storage device may be improved. As such, management of cache memory is required to increase utilization of the cache memory.

SUMMARY

Example embodiments of the inventive concepts may provide a storage controller in which utilization of cache memory may be increased, and an operating method of the storage controller.

According to an example embodiment of the inventive concepts, there is provided a storage controller including a host interface configured to communicate with a host, a buffer memory configured to buffer data read from a non-volatile memory, a cache memory including a plurality of cache lines and configured to store the data in at least one of the plurality of cache lines, and a cache controller configured to manage a status bitmap, the status bitmap indicating priority information of the plurality of cache lines according to an operation corresponding to a request received from the host interface, and the cache controller further configured to select a victim cache line, among the plurality of cache lines, to be replaced based on the status bitmap, wherein the operation corresponds to one of normal read, prefetch, read-after-read, or read-after-prefetch.

According to another example embodiment of the inventive concepts, there is provided a storage controller including a buffer memory configured to buffer data read from a non-volatile memory, a cache memory including a plurality of cache lines, and a cache controller configured to select a victim cache line, among the plurality of cache lines, to be replaced based on a priority of the plurality of cache lines, wherein the cache controller is further configured to set a priority of a first cache line corresponding to prefetch or read-after-read higher than a priority of a second cache line corresponding to normal read or read-after-prefetch.

According to another example embodiment of the inventive concepts, there is provided an operating method of a storage controller including a cache memory, the method including receiving a read request or a prefetch request, determining whether a cache hit has occurred, in response to the read request or the prefetch request, adjusting a priority of at least one of a plurality of cache lines included in the cache memory according to characteristics of data, and selecting a victim cache line to be replaced among the plurality of cache lines based on the priority in response to the cache hit not occurring, wherein the characteristics of the data are changed according to normal read, prefetch, read-after-read, or read-after-prefetch, and the adjusting of the priority includes setting a priority of a cache line storing prefetch data corresponding to the prefetch or read-after-read data corresponding to the read-after-read higher than a priority of a cache line storing read-after-prefetch data corresponding to the read-after-prefetch.

According to another example embodiment of the inventive concepts, there is provided a storage device including a non-volatile memory and a storage controller configured to control the non-volatile memory, wherein the storage controller includes a host interface configured to communicate with a host, a buffer memory configured to buffer data read from the non-volatile memory, a cache memory including a plurality of cache lines, and a cache controller configured to, in response to a request being received from the host interface, determine whether data corresponding to the request exists in the cache memory, and in response to the data does not existing in the cache memory, selecting a victim cache line to be replaced among the plurality of cache lines, based on a priority of the plurality of cache lines, and the cache controller is further configured to set a priority of a first cache line corresponding to prefetch or read-after-read higher than a priority of a second cache line corresponding to normal read or read-after-prefetch.

BRIEF DESCRIPTION OF THE DRAWINGS

Some example embodiments will be more clearly understood from the following detailed description taken in conjunction with the accompanying drawings in which:

FIG. 2 is a block diagram of a storage controller according to some example embodiments;

FIG. 3 is a cache management unit according to some example embodiments;

DETAILED DESCRIPTION

Hereinafter, some example embodiments are described in detail with reference to the accompanying drawings.

Figure 1:
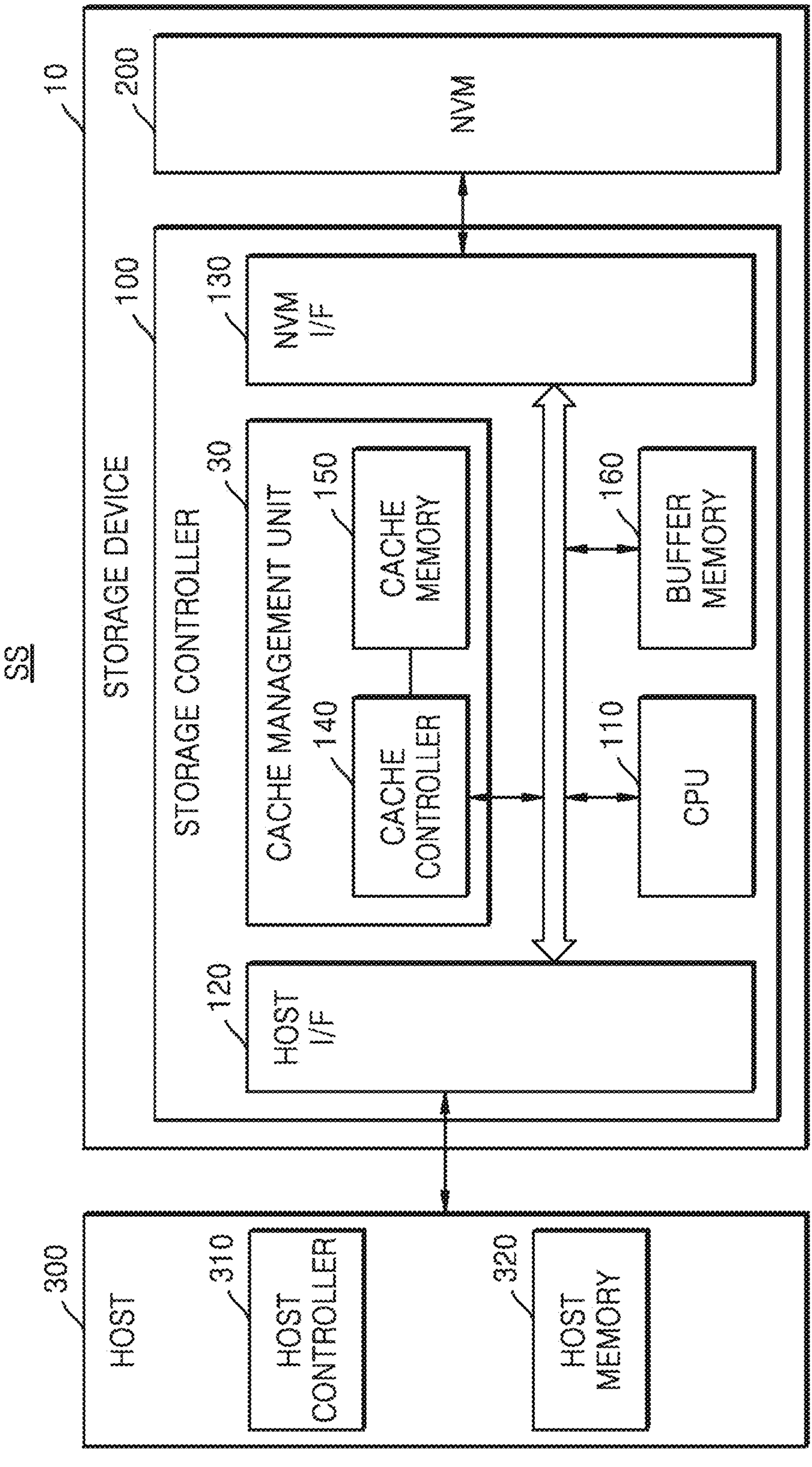
FIG. 1 is a block diagram of a storage system according to some example embodiments.

FIG. 1 is a block diagram of a storage system SS according to some example embodiments.

Referring to FIG. 1, the storage system SS may include a storage device 10 and a host 300, and thus, the storage system SS may be referred to as a host-storage system. The storage device 10 may include a storage controller 100 and a non-volatile memory (NVM) 200. According to some example embodiments, the storage controller 100 may be referred to as a controller, a memory controller, or an NVM controller. The host 300 may include a host controller 310 and a host memory 320. The host memory 320 may function as buffer memory for temporarily storing data to be transmitted to the storage device 10 or data transmitted from the storage device 10.

The storage device 10 may include storage media for storing data according to a request from the host 300. As an example, the storage device 10 may include at least one of a solid-state drive (SSD), embedded memory, and removable external memory. When the storage device 10 is an SSD, the storage device 10 may follow the NVM express (NVMe) standard. When the storage device 10 is embedded memory or external memory, the storage device 10 may follow a universal flash storage (UFS) or embedded multi-media card (eMMC) standard. Each of the host 300 and the storage device 10 may generate and transmit a packet according to an adopted standard protocol.

When the NVM 200 of the storage device 10 includes flash memory, the flash memory may include a two-dimensional (2D) NAND memory array or a three-dimensional (3D) NAND (or vertical NAND, VNAND) memory array. As another example, the storage device 10 may also include other various types of NVM. For example, the storage device 10 may include magnetic RAM (MRAM), spin-transfer torque MRAM, conductive bridging RAM (CBRAM), ferroelectric RAM (FeRAM), phase RAM (PRAM), resistive RAM, and other various types of memory. According to an example embodiment, the NVM 200 may include a plurality of memory chips, a plurality of memory dies, or a plurality of memory planes.

The storage controller 100 may include a central processing unit (CPU) 110, a host interface (host I/F) 120, and an NVM interface (NVM I/F) 130. The CPU 110 may control all operations of the storage controller 100. In some example embodiments, the CPU 110 may be implemented as a multi-core processor, and for example, may be implemented as a dual-core processor or a quad-core processor. The host I/F 120 may transmit/receive a packet to/from the host 300.

A packet transmitted from the host 300 to the host I/F 120 may include a request or data to be written to the NVM 200, and a packet transmitted from the host I/F 120 to the host 300 may include a response to a request or data read from the NVM 200. The NVM I/F 130 may transmit data to be written to the NVM 200 to the NVM 200 or receive data read from the NVM 200. The NVM I/F 130 may be implemented to comply with a standard protocol such as a toggle or an open NAND flash interface (ONFI).

The storage controller 100 may further include a cache controller 140, a cache memory 150, and a buffer memory 160. In this regard, the cache controller 140 and the cache memory 150 may constitute a cache management device or a cache management unit 30. In some example embodiments, the CPU 110, the cache controller 140, the cache memory 150, and the buffer memory 160 may each be implemented as a controller chip. In some example embodiments, the CPU 110, the cache controller 140, and the cache memory 150 may each be implemented as a controller chip, and the buffer memory 160 may be implemented as a separate memory chip.

The buffer memory 160 may buffer write data which is received from the host 300 and is to be written to the NVM 200 and read data which is read from the NVM 200 and is to be transmitted to the host 300. In an example embodiment, the cache memory 150 may store some of data buffered in the buffer memory 160. In an example embodiment, the cache memory 150 may store location information and logical addresses of data buffered in the buffer memory 160. For example, the cache memory 150 may store a location where data corresponding to a logical address is stored in the buffer memory 160. For example, the logical address may include a logical block number (LBN) or a logical page number (LPN). The operating speed of the cache memory 150 may be greater than the operating speed of the buffer memory 160, and the capacity of the cache memory 150 may be smaller than the capacity of the buffer memory 160. For example, the cache memory 150 may include SRAM, and the buffer memory 160 may include DRAM, but the inventive concept is not limited thereto.

When a request is received from the host 300, the storage controller 100 may access the cache memory 150 and check whether data corresponding to the request exists. When the data exists in the cache memory 150, it is considered that a cache hit has occurred, and the data may be rapidly transmitted to the host 300. In particular, the storage controller 100 may determine that a cache hit has occurred when a valid bit is 1 by referring to a status bitmap or a cache entry status bitmap (e.g., 141 of FIG. 2). In addition, the storage controller 100 may determine that a cache hit has occurred when a logical address received from the host 300 matches a cache tag stored in a cache entry. As such, the storage controller 100 may determine whether the cache hit has occurred, based on the valid bit of the status bitmap and the cache tag.

Meanwhile, when the data does not exist in the cache memory 150, it is considered that a cache miss has occurred, and data may be requested by accessing the buffer memory 160. In this case, when the data does not exist in the buffer memory 160, the data may be read from the NVM 200. For example, the storage controller 100 may determine that a cache miss has occurred when a valid bit is 0 by referring to a status bitmap or a cache entry status bitmap (e.g., 141 of FIG. 2).

A cache hit ratio, which is an indicator of the performance of the cache memory 150, may be obtained from the number of cache hits relative to the number of total requests and accesses (i.e., cache hit ratio=(the number of cache hits)/(the number of total requests and accesses)*100). As the cache hit ratio increases, the operating speed and performance of the storage system SS may be improved. Accordingly, there is a need for a method of increasing utilization of the cache memory 150 and increasing a cache hit ratio by setting the lifespan of data retained in the cache memory 150 differently depending on characteristics of data stored in the cache memory 150.

In a case where the cache memory is managed regardless of characteristics of data, data with a high reusability may be removed from the cache memory before being reused. When data is removed from the cache memory before being reused, an access request for the data is received, and a data read operation needs to be performed, a cache miss occurs. Thus, the performance of the storage device may deteriorate. For example, when data to be removed from the cache memory is selected in a manner such as first-in-first-out (FIFO), last-in-first-out (LIFO), least recently used (LRU), or round robin (RR) without distinction between an operation according to a request from the host 300 and an operation according to a prefetch request from the storage controller 100, utilization of the cache memory may decrease.

According to some example embodiments, the cache controller 140 may set a priority according to characteristics of data stored in the cache memory 150 and may select data to be removed from the cache memory 150, based on the set priority. In particular, in the event of a cache miss, the cache controller 140 may select a victim cache line to be replaced from among a plurality of cache lines, based on a priority of the plurality of cache lines of the cache memory 150, and may control an eviction operation for replacing the selected victim cache line. Herein, the "priority" may be set based on reusability of data, and accordingly, data or cache line having a low priority may be first selected as a victim cache line, and data or cache line having a high priority may be selected as the victim cache line later.

Data stored in the cache memory 150 may include normal read data by a normal read operation, prefetch data by a prefetch operation, read-after-read data by a read-after-read operation, and/or read-after-prefetch data by a read-after-prefetch operation. As such, characteristics of data stored in the cache memory 150 may be different depending on an operation, that is, normal read, prefetch, read-after-read, or read-after-prefetch, corresponding to the respective data.

The cache controller 140 may set a priority of cache lines differently according to characteristics of data and may select a victim cache line based on the priority. Accordingly, the probability that a cache line, in which data having a high priority among data stored in the cache memory 150 is stored, is likely to be selected as a victim cache line may be reduced. Accordingly, reusability of the data may be increased by increasing retention lifespan of the data in the cache memory 150. Meanwhile, the probability that a cache line, in which data having a low priority among the data stored in the cache memory 150 is stored, is likely to be selected as the victim cache line may increase. Therefore, the retention lifespan of the data in the cache memory 150 may be reduced, and data having a low priority may be prevented from unnecessarily occupying resources of the cache memory 150. As such, utilization of the cache memory 150 may be increased by managing the cache memory 150 according to a priority.

FIG. 2 is a block diagram of a storage controller 100*a* according to some example embodiments.

Referring to both FIGS. 1 and 2, the storage controller 100*a* may correspond to an implementation of an example embodiment of the storage controller 100 of FIG. 1, and the descriptions given above with reference to FIG. 1 may be applied to the present example embodiment. The storage controller 100*a* may include the cache management unit 30, the host I/F 120, the NVM I/F 130, the buffer memory 160, and a buffer management unit 165. For example, the cache management unit 30, the buffer memory 160, and the buffer management unit 165 may be included in a controller chip 20. For example, the controller chip 20 may be arranged between the host I/F 120 and the NVM I/F 130.

The host I/F 120 may include a command queue and/or a request queue, and the request queue may queue a plurality of read requests RR and a plurality of prefetch requests PR. In particular, the host I/F 120 may sequentially receive a plurality of requests or a plurality of commands from the host 300, and the plurality of received requests or the plurality of received commands may be queued in a request queue or command queue within the host I/F 120.

The host I/F 120 may receive the read request RR including a logical address from the host 300. In other words, the read request RR may correspond to a request received from the host 300, and an operation corresponding to the read request RR may be normal read, read-after-read, or read-after-prefetch. The normal read may be an operation corresponding to a first read request including a first logical address (e.g., LPN1). The read-after-read may correspond to, after a first read request including a first logical address (e.g., LPN1) is received, an operation when a second read request including the first logical address (e.g., LPN1) is received. The read-after-prefetch may correspond to, after a prefetch request including a first logical address (e.g., LPN1) is issued, an operation when a first read request including the first logical address (e.g., LPN1) is received.

In addition, the host I/F 120 may issue the prefetch request PR when read requests respectively corresponding to consecutive logical addresses are sequentially received from the host 300. For example, when a first read request corresponding to a first logical address (e.g., LPN1) is received from the host 300, and then a second read request corresponding to a second logical address (e.g., LPN2) is received, the host I/F 120 may issue a prefetch request corresponding to a third logical address (e.g., LPN3). In other words, the prefetch request PR may correspond to a request issued by the storage controller 100*a* itself, and an operation corresponding to the prefetch request PR may be prefetch.

The host I/F 120 may transmit a request REQ to the cache management unit 30, and the cache controller 140 may determine whether data corresponding to the request REQ exists in the cache memory 150. In the case of a cache hit HIT in which the data exists in the cache memory 150, the cache management unit 30 may provide a response RSP including the data to the host I/F 120. Meanwhile, in the case of a cache miss MISS in which the data does not exist in the cache memory 150, the cache management unit 30 may transmit a read request READ_REQ to the NVM I/F 130.

The cache controller 140 may manage the cache entry status bitmap 141 indicating priority information of a plurality of cache lines of the cache memory 150. In addition, the cache controller 140 may include a victim selection controller VSC, and the victim selection controller VSC may select a victim cache line in consideration of priority information of a plurality of cache lines based on the cache entry status bitmap 141. In particular, the victim selection controller VSC may select a cache line with a lower priority as a victim cache line.

In some example embodiments, when the request REQ is received from the host I/F 120 or when a request for cache deallocation is received from the buffer management unit 165, the victim selection controller VSC may perform a selection operation on a victim cache line. When the buffer memory 160 is almost full, the buffer management unit 165 may transmit a request for cache deallocation to the cache management unit 30. A detailed configuration and operation of the victim selection controller VSC are described below with reference to FIG. 3.

FIG. 3 shows the cache management unit 30 according to some example embodiments.

Referring to FIGS. 1 to 3 together, the cache management unit 30 may include the cache controller 140 and the cache memory 150. The cache memory 150 may include first to nth cache lines CL0 to CLn, wherein n is a positive integer. For example, n may be 511, but the inventive concept is not limited thereto. An operation of copying data existing in external memory, for example, the buffer memory 160, to a cache line is referred to as a line fill. When data is loaded from the buffer memory 160 to the cache memory 150, data sufficient to fill a cache line may be loaded. For example, the size of a cache line may be 32, 64, or 128 bytes, but the inventive concept is not limited thereto.

The cache controller 140 may manage the cache entry status bitmap 141. For example, the cache entry status bitmap 141 may be stored in a register. However, the inventive concept is not limited thereto, and the cache entry status bitmap 141 may be stored in memory. The cache entry status bitmap 141 may store status bits for a plurality of cache entries. In other words, the cache entry status bitmap 141 may store a plurality of status bit sets indicating a status of each of a plurality of cache lines corresponding to each of a plurality of cache entries.

For example, the cache entry status bitmap 141 may include a promotion bitmap for setting a priority, and the promotion bitmap may include promotion bits respectively corresponding to a plurality of cache entries. For example, the cache entry status bitmap 141 may include a prefetch bitmap for indicating whether there is prefetch, and the prefetch bitmap may include prefetch bits respectively corresponding to a plurality of cache entries. For example, the cache entry status bitmap 141 may include a valid bitmap for indicating whether data is valid, and the valid bitmap may include valid bits respectively corresponding to a plurality of cache entries. For example, the cache entry status bitmap 141 may include a done bitmap for indicating whether a service is completed, and the done bitmap may include done bits respectively corresponding to a plurality of cache entries.

In some example embodiments, status bits corresponding to each cache entries may include a valid bit, a promotion bit, a prefetch bit, and a done bit. The valid bit indicates whether data of a cache line corresponding to a cache entry is valid. The promotion bit indicates a priority of a cache line corresponding to a cache entry. The prefetch bit indicates whether data of a cache line corresponding to a cache entry is prefetch data. The done bit indicates whether a service for data of a cache line corresponding to a cache entry is completed. In this regard, the cache entry may be information mapped to the cache line. In some example embodiments, a plurality of cache entries may respectively correspond to a plurality of cache lines. However, the inventive concepts are not limited thereto, and two or more cache entries may correspond to one cache line.

In particular, a cache entry is the smallest logical unit into which data of the cache memory 150 is divided, and a plurality of cache entries may be gathered to constitute the entire cache memory 150. The cache entry may include a cache tag and a cache block. The cache block is a unit of a data group and may store actual data to be included in the cache memory 150. The cache entry status bitmap 141 is described in more detail with reference to FIG. 4B.

The cache controller 140 may include the victim selection controller VSC configured to select a victim cache line based on the cache entry status bitmap 141. The victim selection controller VSC may include a victim condition composition unit 142, a victim cache line selection unit 143, and a downgrade unit 144. In some example embodiments, the victim condition composition unit 142, the victim cache line selection unit 143, and the downgrade unit 144 may each be configured as hardware. However, the inventive concept is not limited thereto, and the victim condition composition unit 142, the victim cache line selection unit 143, and the downgrade unit 144 may each be configured as firmware.

The victim condition composition unit 142 may reconfigure or update the cache entry status bitmap 141 based on characteristics of a request or characteristics of data, during a cache allocation operation. In addition, the victim condition composition unit 142 may reconfigure or update the cache entry status bitmap 141 based on characteristics of a request or characteristics of data, during a cache deallocation operation. Subsequently, the victim condition composition unit 142 may calculate victim condition values respectively corresponding to a plurality of cache entries from the updated cache entry status bitmap 141.

In particular, the victim condition composition unit 142 may set a valid bit to 1 when allocating a cache line, and may clear a valid bit to 0 when deallocating a cache line. For example, when a system is reset or when flushing of the cache memory 150 occurs, a valid bit may be cleared to 0. In addition, in the case of a prefetch request, the victim condition composition unit 142 may set a prefetch bit to 1 and may set a promotion bit to 1. In addition, the victim condition composition unit 142 may set a promotion bit to 1 in the case of read-after-read and may clear the promotion bit to 0 in the case of read-after-prefetch.

When a request is received, the victim cache line selection unit 143 may select a victim cache line among a plurality of cache lines based on victim candidates or victim condition values. In some example embodiments, when a request is received from the host I/F 120, the victim cache line selection unit 143 may select a victim cache line. In some example embodiments, when a cache deallocation request is received from a buffer management device or the buffer management unit 165, which manages the buffer memory 160, the victim cache line selection unit 143 may select a victim cache line.

In some example embodiments, the victim cache line selection unit 143 may perform a victim cache line selection operation based on a pointer. In particular, starting from a current pointer, a cache entry that first satisfies a victim condition may be selected as a victim cache entry, and an index of the selected cache entry may be transmitted to the cache memory 150. Subsequently, the victim cache line selection unit 143 may update the current pointer to a previous pointer and update the selected victim cache entry to a current pointer.

The downgrade unit 144 may downgrade promotion bits corresponding to cache entries between the previous pointer and the current pointer to 0. Accordingly, the probability that the cache entries between the previous pointer and the current pointer are selected as a victim cache line may increase in the next victim cache line selection operation. As such, it is possible to provide a uniform retention period for a promoted cache line by downgrading a promotion bit based on a pointer, and thus, a memory resource may be secured by bringing a time point for eviction of an unnecessary cache line forward.

Figure 4A:
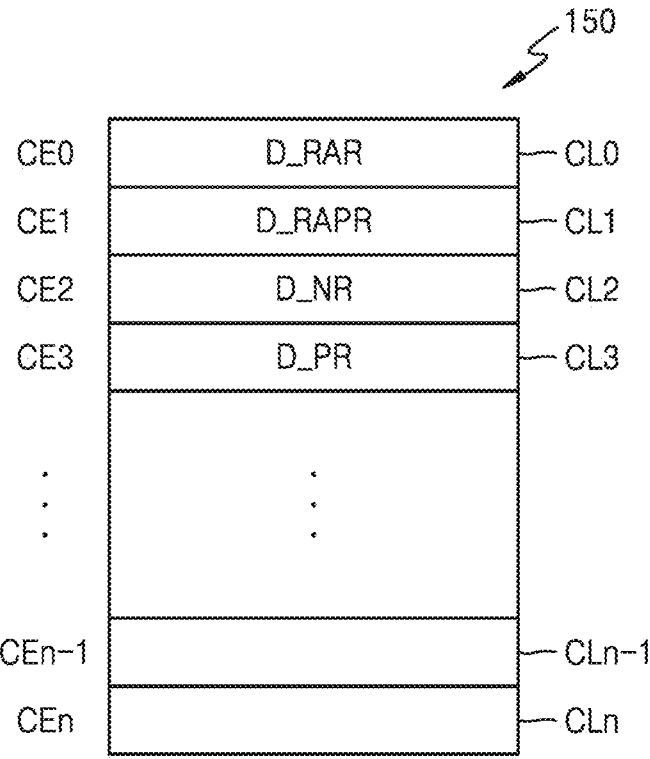
FIG. 4A shows cache memory according to some example embodiments.

FIG. 4A shows the cache memory 150 according to some example embodiments.

Referring to FIG. 4A, the cache memory 150 may include the first to nth cache lines CL0 to CLn, and the first to nth cache lines CL0 to CLn may respectively correspond to first to nth cache entries CE0 to CEn. In this case, an index of each of the first to nth cache entries CE0 to CEn is 0 to n. For example, the first cache line CL0 may store read-after-read data D_RAR read by read-after-read. For example, the second cache line CL1 may store read-after-prefetch data D_RAPR read by read-after-prefetch. For example, the third cache line CL2 may store normal read data D_NR read by normal read. For example, the fourth cache line CL3 may store prefetch data D_PR read by prefetch.

Considering temporal locality, in which data once referenced is highly likely to be referenced again after a while, the reusability of the read-after-read data D_RAR may be high. Thus, a priority of the first cache line CL0 may be set high. Accordingly, the first cache line CL0 may not be selected as a victim cache line, and the read-after-read data D_RAR may be retained in the cache memory 150 for a relatively long period of time.

Considering spatial locality, in which data near data referenced during successive access to a data array is highly likely to be used after a while, the reusability of the prefetch data D_PR is high. Thus, a priority of the fourth cache line CL3 may be set high. Accordingly, the fourth cache line CL3 may not be selected as a victim cache line, and the prefetch data D_PR may be retained in the cache memory 150 for a relatively long period of time.

Meanwhile, since reusability of the read-after-prefetch data D_RAPR and the normal read data D_NR may be low, the priorities of the second and third cache lines CL1 and CL2 may be set low. Accordingly, the second and third cache lines CL1 and CL2 may be selected as victim cache lines, and the read-after-prefetch data D_RAPR and the normal read data D_NR may be retained in the cache memory 150 for a relatively short period of time.

Figure 4B:
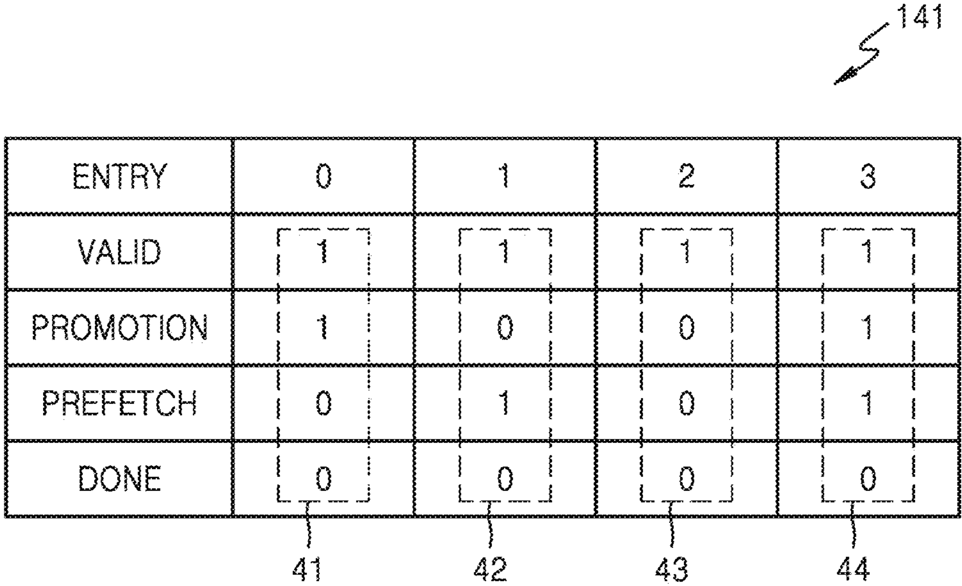
FIG. 4B shows a cache entry status bitmap according to some example embodiments.

FIG. 4B shows the cache entry status bitmap 141 according to some example embodiments.

Referring to both FIGS. 4A and 4B, the cache entry status bitmap 141 may include first to fourth status bits 41 to 44 respectively corresponding to the first to fourth cache entries CE0 to CE3. Each of the first to fourth status bits 41 to 44 may include a valid bit, a promotion bit, a prefetch bit, and a done bit.

For example, since the first cache line CL0 corresponding to the first cache entry CE0 may store the read-after-read data D_RAR, a valid bit of the first cache entry CE0 may be 1, a promotion bit of the first cache entry CE0 may be 1, and a prefetch bit of the first cache entry CE0 may be 0. Before a service for the read-after-read data D_RAR is completed, that is, before data transmission to the host 300 is completed, a done bit may be 0.

For example, since the second cache line CL1 corresponding to the second cache entry CE1 may store the read-after-prefetch data D_RAPR, a valid bit of the second cache entry CE1 may be 1, a promotion bit of the second cache entry CE1 may be 0, and a prefetch bit of the second cache entry CE1 may be 1. Before a service for the read-after-prefetch data D_RAPR is completed, that is, before data transmission to the host 300 is completed, a done bit may be 0.

For example, since the third cache line CL2 corresponding to the third cache entry CE2 may store the normal read data D_NR, a valid bit of the third cache entry CE2 may be 1, a promotion bit of the third cache entry CE2 may be 0, and a prefetch bit of the third cache entry CE2 may be 0. Before a service for the normal read data D_NR is completed, that is, before data transmission to the host 300 is completed, a done bit may be 0.

For example, since the fourth cache line CL3 corresponding to the fourth cache entry CE3 may store the prefetch data D_PR, a valid bit of the fourth cache entry CE3 may be 1, a promotion bit of the fourth cache entry CE3 may be 1, and a prefetch bit of the fourth cache entry CE3 may be 1. Before a service for the prefetch data D_PR is completed, that is, before data loading to the buffer memory 160 is completed, a done bit may be 0.

Figure 5:
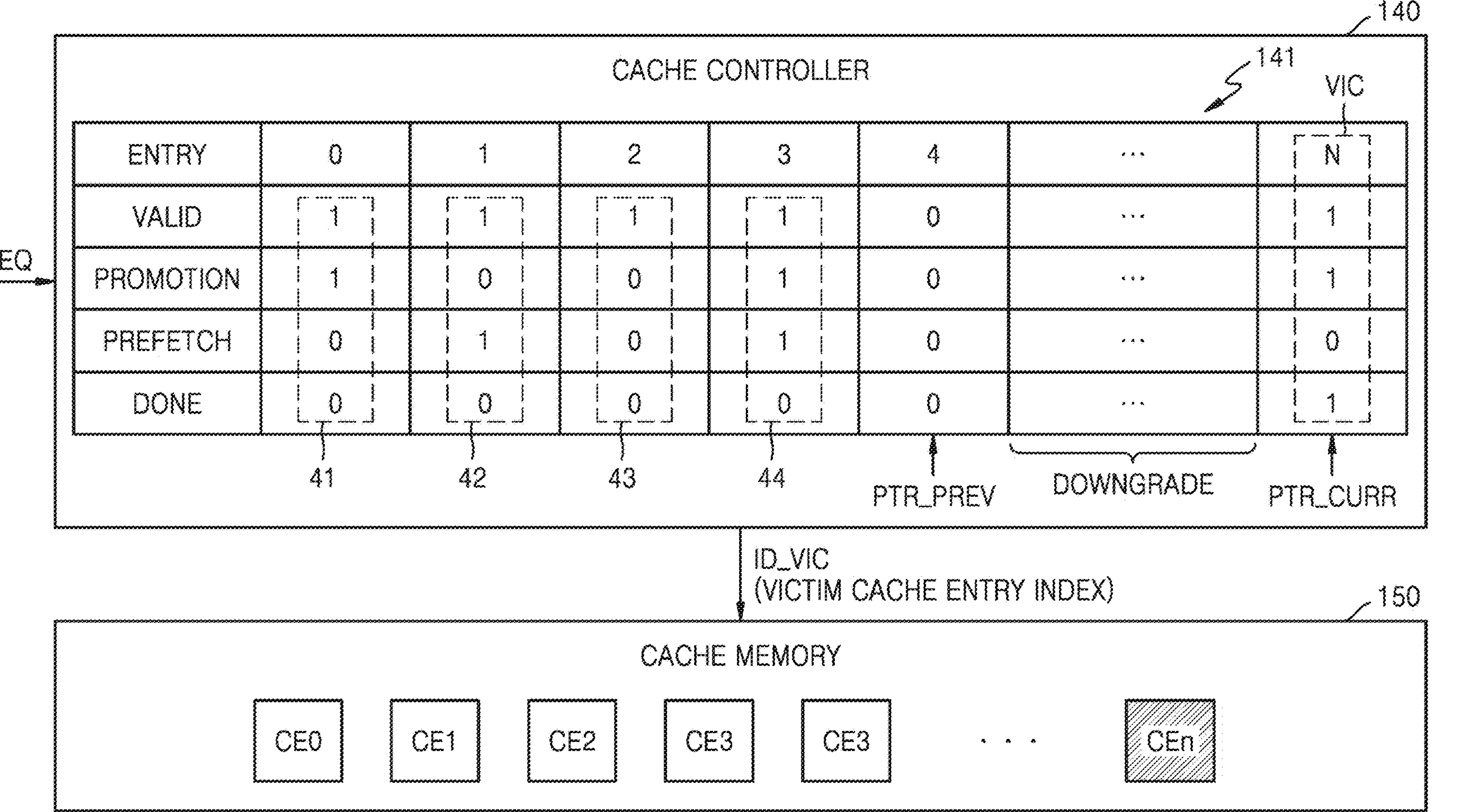
FIG. 5 shows a cache controller and cache memory, according to some example embodiments.

FIG. 5 shows the cache controller 140 and the cache memory 150, according to some example embodiments.

Referring to FIGS. 1 to 5 together, the cache controller 140 may receive the request REQ. For example, the cache controller 140 may receive the request REQ from the host I/F 120. An operation according to the request REQ may correspond to normal read, read-after-read, read-after-prefetch, or prefetch. In an example embodiment, the request REQ may correspond to a read request received from the host 300, and in this case, an operation corresponding to the read request may correspond to normal read, read-after-read, or read-after-prefetch. In an example embodiment, the request REQ may correspond to a prefetch request generated by the host I/F 120, and in this case, an operation corresponding to the prefetch request may correspond to prefetch.

The cache controller 140 may determine whether there is a cache hit in response to the request REQ. In particular, the cache controller 140 may determine that a cache hit has occurred when a valid bit is 1 by referring to the cache entry status bitmap 141. In addition, the cache controller 140 may determine that a cache hit has occurred when a logical address received from the host 300 matches a cache tag stored in a cache entry. When a cache hit occurs, the cache controller 140 may not perform a victim cache line selection operation and may provide a response corresponding to the request REQ to the host I/F 120.

Meanwhile, when a cache miss occurs, the cache controller 140 may perform a victim cache line selection operation and may provide an ID ID_VIC corresponding to a selected victim cache line to the cache memory 150. For example, the ID ID_VIC may correspond to a victim cache entry index. For example, when a victim cache entry index is N, the nth cache line CLn corresponding to the nth cache entry CEn may be a victim cache line. Accordingly, the nth cache line CLn corresponding to the nth cache entry CEn among a plurality of cache lines included in the cache memory 150 may be replaced.

When a cache miss occurs, the victim condition composition unit 142 may update the cache entry status bitmap 141 based on an operation corresponding to the request REQ or data characteristics, and may calculate victim candidates from the updated cache entry status bitmap 141. The victim cache line selection unit 143 may select the nth cache entry CEn as a victim cache entry corresponding to a victim cache line based on the updated cache entry status bitmap 141. Subsequently, the victim cache line selection unit 143 may update a current pointer to a previous pointer and may update the location of the victim cache entry to a new current pointer. The downgrade unit 144 may downgrade promotion bits of cache entries between the previous pointer and the new current pointer to 0.

Figure 6:
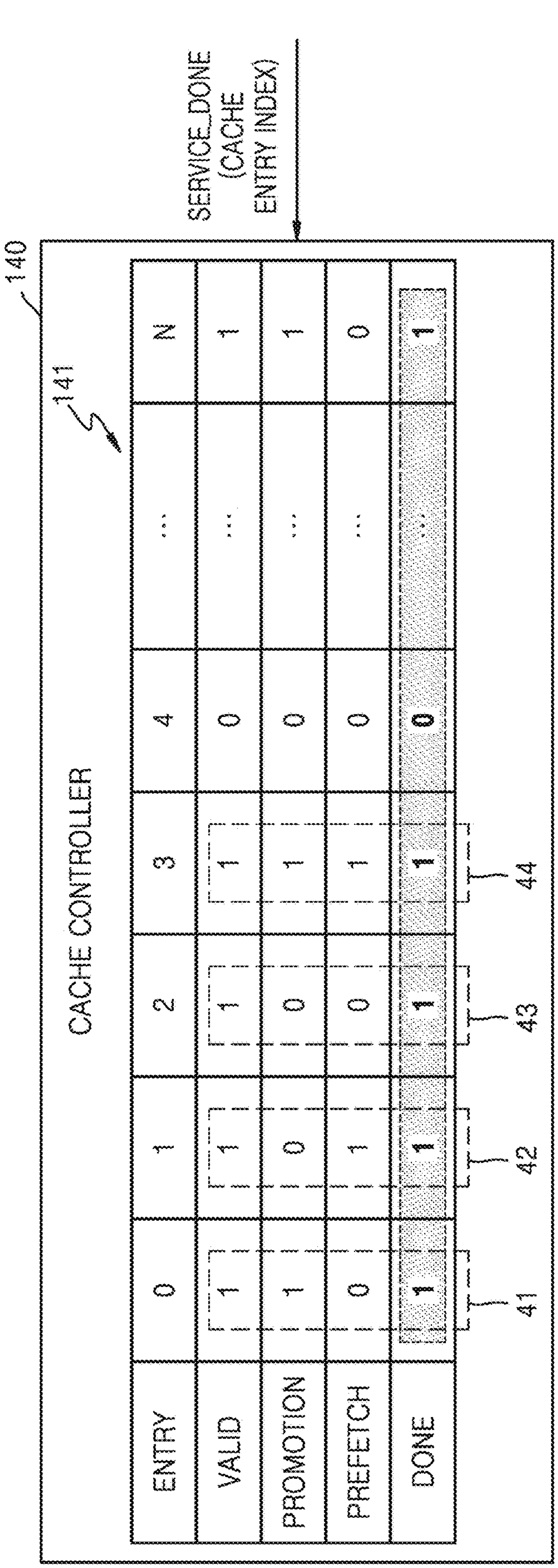
FIG. 6 shows an operation of setting a done bit in a cache entry status bitmap, according to some example embodiments.

FIG. 6 shows an operation of setting a done bit in the cache entry status bitmap 141, according to some example embodiments.

Referring to both FIGS. 5 and 6, the cache controller 140 may set done bits of the cache entry status bitmap 141 according to a service done signal SERVICE_DONE indicating whether a service is completed. For example, the service done signal SERVICE_DONE may include an index of a cache entry for which service has been completed. For example, when services for the first to fourth cache entries CE0 to CE3 and the nth cache entry CEn are completed, the cache controller 140 may set done bits of the first to fourth cache entries CE0 to CE3 and the nth cache entry CEn to 1. For example, when a service for the fifth cache entry CE4 is not completed, the cache controller 140 may maintain a done bit of the fifth cache entry CE4 to 0.

For example, in a case where an operation corresponding to the request REQ is normal read, read-after-read, or read-after-prefetch, when data transmission to the host 300 is completed, it may be considered that a service is completed. In this case, in response to a cache entry index corresponding to the normal read, the read-after-read, or the read-after-prefetch, the cache controller 140 may set a done bit corresponding to the cache entry index to 1. For example, in a case where an operation corresponding to the request REQ is prefetch, when data loading to the buffer memory 160 is completed, it may be considered that a service is completed. In this case, in response to a cache entry index corresponding to the prefetch, the cache controller 140 may set a done bit corresponding to the cache entry index to 1.

Meanwhile, when a cache hit occurs and a host service is required again, the cache controller 140 may clear the done bit to 0. For example, after data transmission to the host 300 is completed by normal read, when a read request including the same logical address is received from the host 300, that is, when read-after-read occurs again, the cache controller 140 may clear a done bit to 0. For example, after data loading to the buffer memory 160 is completed by prefetch, when a read request including the same logical address is received from the host 300, that is, when read-after-prefetch occurs again, the cache controller 140 may clear a done bit to 0.

Figure 7:
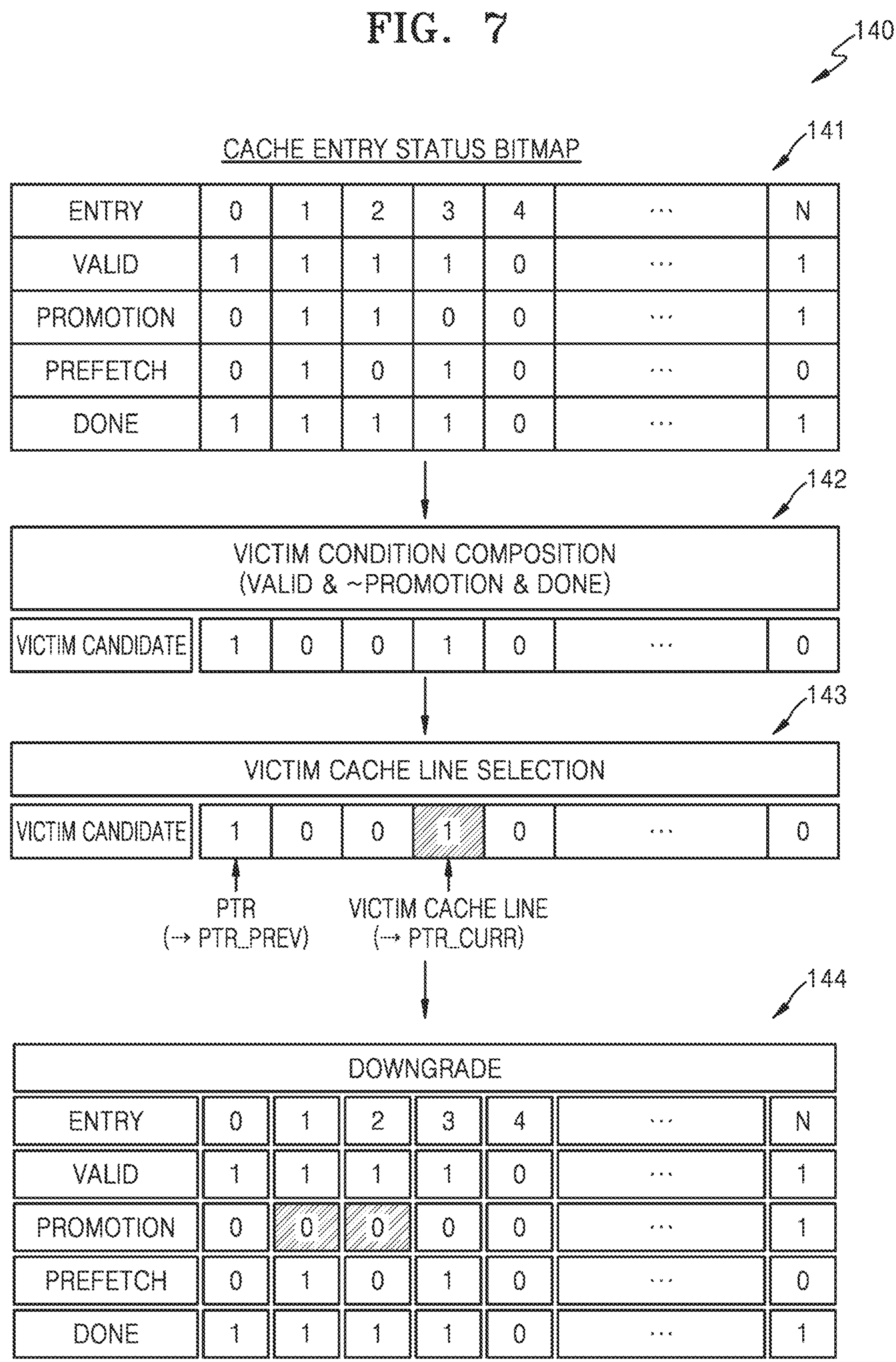
FIG. 7 shows an operation of a cache controller, according to some example embodiments.

FIG. 7 shows a victim cache line selection operation of the cache controller 140, according to some example embodiments.

Referring to FIG. 7, the cache controller 140 may perform a victim cache line selection operation in response to a cache miss. The victim condition composition unit 142 may update the cache entry status bitmap 141 according to an operation corresponding to the request REQ and may calculate victim condition values respectively corresponding to a plurality of cache entries from the updated cache entry status bitmap 141 according to a victim condition. In this regard, the victim condition values may respectively correspond to victim candidates selectable as a victim cache line.

In some example embodiments, a victim condition value may be determined based on a promotion bit PROMOTION and a done bit DONE, and for example, a victim condition result may be generated through an AND operation of a not operation result ~PROMOTION for the promotion bit PROMOTION and the done bit DONE (i.e., VICTIM CONDITON=~PROMOTION & DONE). Accordingly, the victim condition composition unit 142 may generate victim condition values respectively for the first to fifth cache entries CE0 to CE4 as 1, 0, 0, 1, and 0, and may determine victim candidates from the generated victim condition values. For example, a cache line corresponding to the fourth cache entry CE3 having a victim condition value of 1 may be selected as a victim cache line.

In some example embodiments, a victim condition value may be determined based on a valid bit VALID, the promotion bit PROMOTION, and the done bit DONE, and for example, a victim condition result may be generated through an AND operation of the valid bit VALID, the not operation result ~PROMOTION for the promotion bit PROMOTION, and the done bit DONE (i.e., VICTIM CONDITION=VALID & ~PROMOTION & DONE). Accordingly, the victim condition composition unit 142 may generate victim condition values respectively for the first to fifth cache entries CE0 to CE4 as 1, 0, 0, 1, and 0, and may determine victim candidates from the generated victim condition values. For example, a cache line corresponding to the fourth cache entry CE3 having a victim condition value of 1 may be selected as a victim cache line.

The victim cache line selection unit 143 may select a victim cache entry corresponding to a victim cache line based on a pointer among victim candidates, that is, victim condition values. In particular, starting from a current pointer PTR, the victim cache line selection unit 143 may select a cache entry having a victim condition value of 1 as a victim cache line. For example, the current pointer PTR may correspond to the first cache entry CE0, and the fourth cache entry CE3, which is the first, among cache entries after the first cache entry CE0, to have a victim condition value of 1, may be selected as a victim cache line. Subsequently, the victim cache line selection unit 143 may perform a pointer update operation. In particular, the victim cache line selection unit 143 may update the current pointer PTR to a previous pointer PTR_PREV and may update the location of the cache entry corresponding to the victim cache line to a current pointer PTR_CURR.

The downgrade unit 144 may downgrade promotion bits of cache entries between the previous pointer PTR_PREV and the current pointer PTR_CURR to 0. For example, promotion bits of the second and third cache entries CE1 and CE2 between the first cache entry CE0 corresponding to the previous pointer PTR_PREV and the fourth cache entry CE3 corresponding to the current pointer PTR_PREV may be downgraded from 1 to 0. Accordingly, since the promotion bits of the second and third cache entries CE1 and CE2 are set to 0, the probability that the second and third cache entries CE1 and CE2 are selected as a victim cache line may increase in the next victim selection operation. Accordingly, a memory resource may be secured by bringing eviction of unnecessary cache lines forward.

Figure 8:
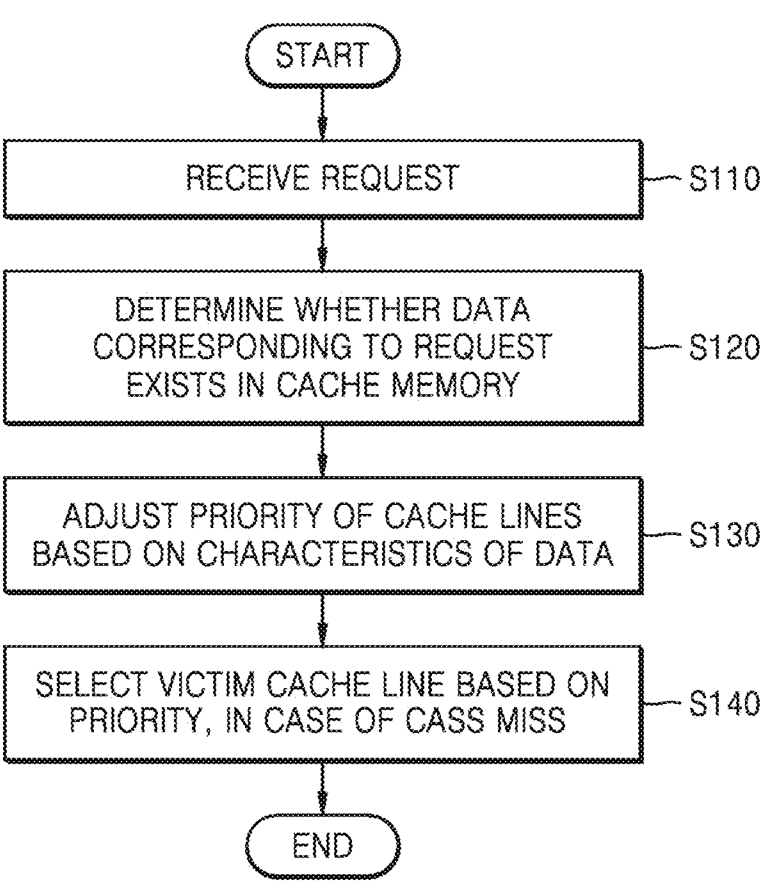
FIG. 8 is a flowchart showing an operating method of a storage controller, according to some example embodiments.

FIG. 8 is a flowchart showing an operating method of a storage controller, according to some example embodiments.

Referring to FIG. 8, the operating method of the storage controller according to the present example embodiments may correspond to a cache management operation of the storage controller, and may be performed, for example, by the storage controller 100 of FIG. 1. For example, the operating method of the storage controller according to the present example embodiments may include operations sequentially performed by the cache controller 140 of FIG. 1. The descriptions given with reference to FIGS. 1 to 7 may be applied to the present example embodiments.

In operation S110, the storage controller 100 receives the request REQ. In some example embodiments, the cache controller 140 may receive a read request or a prefetch request from the host I/F 120. The read request may be received from the host 300, and the prefetch request may be issued from the host I/F 120. In some example embodiments, the cache controller 140 may receive a cache deallocation request from the buffer management unit 165.

In operation S120, the storage controller 100 determines whether there is a cache hit. In some example embodiments, the storage controller 100 determines whether data corresponding to the request REQ exists in the cache memory 150. In particular, the storage controller 100 may determine that a cache hit has occurred when a valid bit is 1 by referring to a status bitmap or a cache entry status bitmap (e.g., 141 of FIG. 2). In addition, the storage controller 100 may determine that a cache hit has occurred when a logical address received from the host 300 matches a cache tag stored in a cache entry. As such, the storage controller 100 may determine whether the cache hit has occurred, based on the valid bit of the status bitmap and the cache tag. In some example embodiments, the storage controller 100 determines whether location information of data corresponding to the request REQ being stored in the buffer memory 160 exists in the cache memory 150. When a cache hit occurs, the storage controller 100 may transmit the response RSP corresponding to the request REQ to the host I/F 120. For example, when the request REQ is a read request, the storage controller 100 may transmit the response RSP including data to the host 300 through the host I/F 120. For example, when the request REQ is a prefetch request, the storage controller 100 may load data to the cache memory 150 or the buffer memory 160 and may transmit the response RSP indicating that the loading of the data is completed to the host I/F 120.

In operation S130, the storage controller 100 adjusts a priority of a plurality of cache lines included in the cache memory 150 based on characteristics of data. The characters of the data may be changed according to an operation corresponding to a request. In particular, the cache controller 140 may determine that reusability of prefetch data or read-after-read data is high and may set a priority of the prefetch data or the read-after-read data relatively high. Meanwhile, the cache controller 140 may determine that reusability of read-after-prefetch data is low and may set a priority of the read-after-prefetch data relatively low.

In operation S140, when a cache miss occurs, the storage controller 100 may select a victim cache line based on the priority of the plurality of cache lines. The cache controller 140 may select, as the victim cache line, a cache line storing data of which a priority is set low among the plurality of cache lines of the cache memory 150. Accordingly, a cache line storing data of which a priority is set high may be stored relatively long period of time in the cache memory 150, and reusability of the data may be increased. Meanwhile, a cache line storing data of which a priority is set low may be stored relatively short period of time in the cache memory 150, thereby increasing utilization of the cache memory 150.

Figure 9:
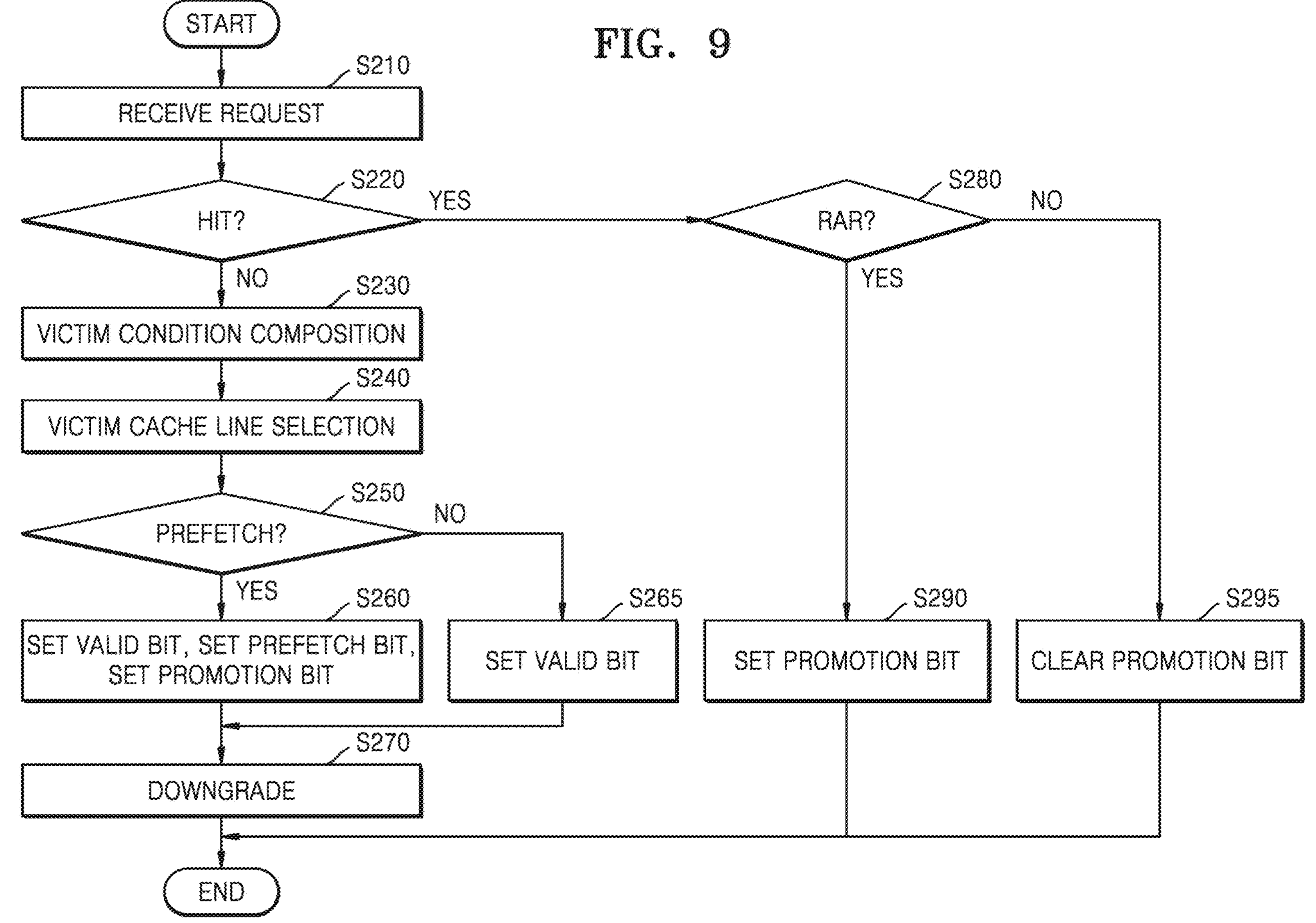
FIG. 9 is a flowchart showing an operating method of a storage controller, according to some example embodiments.

FIG. 9 is a flowchart showing an operating method of a storage controller, according to some example embodiments.

Referring to FIG. 9, the operating method of the storage controller according to the present example embodiments may correspond to an implementation example of the operating method illustrated in FIG. 8, and may be performed by the cache controller 140 of FIG. 1. In operation S210, the cache controller 140 may receive the request REQ. For example, the request REQ may be a read request received from the host 300 or a prefetch request issued from the host I/F 120. In operation S220, the cache controller 140 determines whether there is a cache hit. For example, the cache controller 140 may determine that a cache hit has occurred when a valid bit is 1 by referring to the cache entry status bitmap 141. In addition, the cache controller 140 may determine that a cache hit has occurred when a logical address received from the host 300 matches a cache tag stored in a cache entry. As such, the cache controller 140 may determine whether the cache hit has occurred based on the valid bit of the status bit map and the cache tag. When the cache hit occurs, operation S280 is performed, and when the cache hit does not occur, that is, when a cache miss occurs, operation S230 is performed.

In operation S230, the cache controller 140 configures a victim condition. For example, the victim condition composition unit 142 may update the cache entry status bitmap 141 according to an operation corresponding to the request REQ or according to characteristics of data and may generate cache candidates or cache condition values from the updated cache entry status bitmap 141. In operation S240, the cache controller 140 selects a victim cache line. For example, the victim cache line selection unit 143 may select a victim cache line by performing a search operation on cache candidates or cache condition values, starting from a current pointer, and may output an index of a cache entry corresponding to the selected victim cache line.

In operation S250, the cache controller 140 determines whether the request REQ is a prefetch request. As a result of the determination, when the request REQ is the prefetch request, in operation S260, the cache controller 140 sets a valid bit to 1, sets a prefetch bit to 1, and sets a promotion bit to 1. Meanwhile, when the request REQ is not the prefetch request, in other words, when the request REQ is a read request, in operation S265, the cache controller 140 sets a valid bit to 1. In operation S270, the cache controller 140 downgrades promotion bits of some cache entries among a plurality of cache entries to 0. For example, the cache controller 140 may downgrade promotion bits of cache entries between a previous pointer and a current pointer to 0.

In operation S280, whether an operation corresponding to the request REQ is read-after-read is determined. In an example embodiment, when the cache hit occurs, it may be seen that data is loaded to the cache memory 150 by normal read or prefetch, which is performed previously. In some example embodiments, when the cache hit occurs, it may be seen that data is loaded to the buffer memory 160 by normal read or prefetch, which is performed previously. In this case, the cache memory 150 may store an address, that is, a storage location of data in the buffer memory 160.

When the operation corresponding to the request REQ is the read-after-read, in operation S290, a promotion bit may be set to 1. For example, the read-after-read may correspond to a case where a plurality of read requests for the same logical address are sequentially received from the host 300. When the plurality of read requests for the same logical address are received, it may be determined that since then, there is a high probability that a read request for the logical address is received again. As such, since it may be considered that reusability of read-after-read data is high, a promotion bit may be set to 1 such that a priority of the read-after-read data is set high. Therefore, the read-after-read data may not be selected as a victim cache line, and retention time of the read-after-read data in the cache memory 150 may be increased.

Meanwhile, when the operation corresponding to the request REQ is read-after-prefetch, in operation S295, a promotion bit is cleared to 0. The read-after-prefetch is a case in which data corresponding to a read request received from the host 300 corresponds to data prefetched by a prefetch request previously issued from the host I/F 120. When a read request for the prefetched data is actually received, the cache controller 140 may provide a response including the prefetched data to the host 300. As such, when a service for the prefetched data is completed, it may be considered that reusability of the prefetched data is low. Therefore, the promotion bit may be cleared to 0 such that a priority of read-after-prefetch data is set low. Therefore, the read-after-prefetch data may be selected as a victim cache line, and the read-after-prefetch data may be evicted from the cache memory 150.

Figure 10:
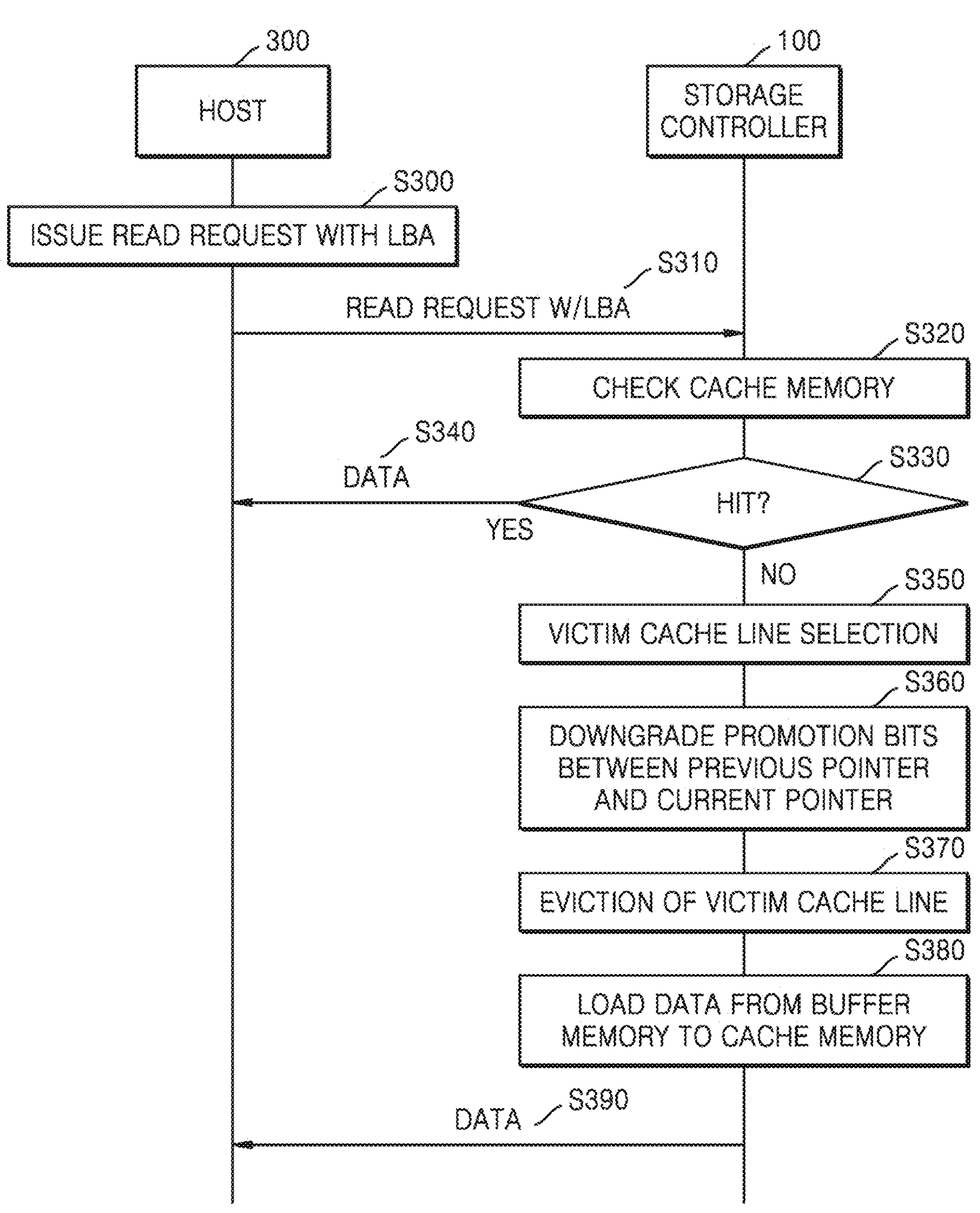
FIG. 10 is a flowchart showing an operation between a host and a storage controller, according to some example embodiments.

FIG. 10 is a flowchart showing an operation between the host 300 and the storage controller 100, according to some example embodiments.

Referring to FIG. 10, the operation according to the present example embodiments may correspond to an example of a normal read operation. In operation S300, the host 300 issues a read request including a logical address (e.g., a logical block address (LBA)). In operation S310, the host 300 transmits the read request including the logical address to the storage controller 100. In operation S320, the storage controller 100 checks the cache memory 150 in response to the read request. In operation S330, the storage controller 100 determines whether there is a cache hit. As a result of the determination, when the cache hit occurs, in operation S340, the storage controller 100 transmits data to the host 300.

Meanwhile, when a cache miss occurs, in operation S350, the storage controller 100 selects a victim cache line in consideration of a priority of cache lines of the cache memory 150. In operation S360, the storage controller 100 downgrades promotion bits between a previous pointer and a current pointer. In operation S370, the storage controller 100 evicts the victim cache line. In operation S380, the storage controller 100 loads data from the buffer memory 160 to the cache memory 150. In an example embodiment, the cache memory 150 may load data or a program. However, the inventive concepts are not limited thereto, and in some example embodiments, the buffer memory 160 may buffer data or a program, and the cache memory 150 may store an address of the buffer memory 160 in which the data or the program is stored. In operation S390, the storage controller 100 transmits the data to the host 300.

Figure 11:
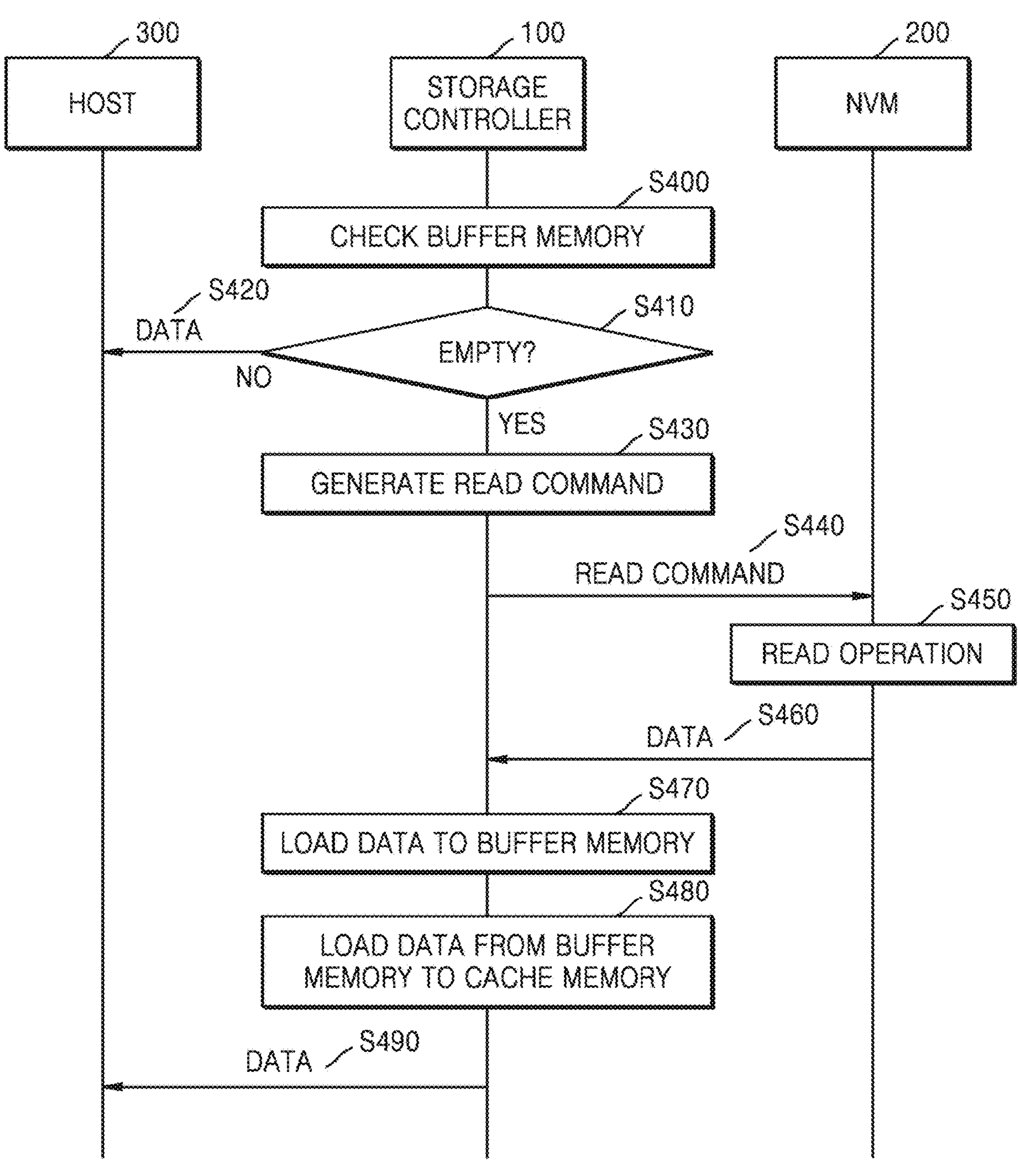
FIG. 11 is a flowchart showing an operation between a host, a storage controller, and non-volatile memory, according to some example embodiments.

FIG. 11 is a flowchart showing an operation between the host 300, the storage controller 100, and the NVM 200, according to some example embodiments.

Referring to FIG. 11, the operation according to the present example embodiments may correspond to an example of a normal read operation. The operation according to the present example embodiments may correspond to an operation after S350 of FIG. 10 or an operation after S370 of FIG. 10. In operation S400, the storage controller 100 checks the buffer memory 160. In operation S410, whether the buffer memory 160 is empty is determined. In this regard, a case where the buffer memory 160 is empty may include a case where the buffer memory 160 is not buffering desired data, for example, read data or prefetch data requested by the host 300. As a result of the determination, when the buffer memory 160 is not empty, in operation S420, the storage controller 100 transmits data to the host 300.

Meanwhile, when the buffer memory 160 is empty, in operation S430, the storage controller 100 generates a read command. In operation S440, the storage controller 100 transmits the read command to the NVM 200. In operation S450, the NVM 200 performs a read operation in response to the read command. In operation S460, the NVM 200 transmits data to the storage controller 100. In operation S470, the storage controller 100 loads the data to the buffer memory 160. In operation S480, the storage controller 100 loads the data from the buffer memory 160 to the cache memory 150. In operation S490, the storage controller 100 transmits the data to the host 300.

Figure 12:
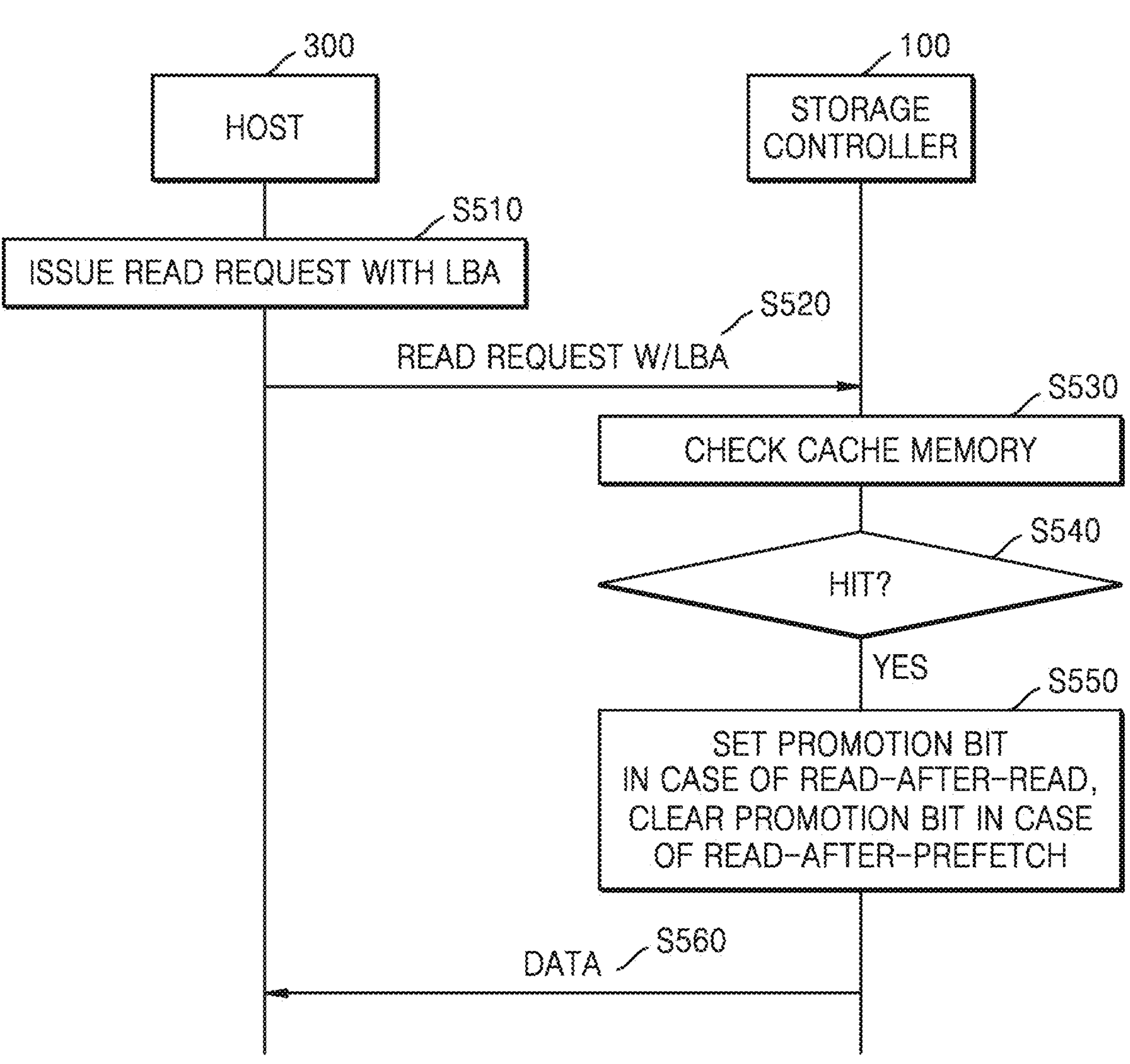
FIG. 12 is a flowchart showing an operation between a host and a storage controller, according to some example embodiments.

FIG. 12 is a flowchart showing an operation between the host 300 and the storage controller 100, according to some example embodiments.

Referring to FIG. 12, the operation according to the present example embodiments may correspond to an example of a read-after-read operation or a read-after-prefetch operation. In operation S510, the host 300 issues a read request including a logical address. In operation S520, the host 300 transmits the read request including the logical address to the storage controller 100. In operation S530, the storage controller 100 checks the cache memory 150. In operation S540, the storage controller 100 determines whether there is a cache hit. As a result of the determination, when the cache hit occurs, the storage controller 100 may determine that an operation corresponding to the request is read-after-read or read-after-prefetch. Meanwhile, as a result of the determination, a case where a cache miss occurs may not correspond to the read-after-read operation or the read-after-prefetch operation. When the cache miss occurs, for example, operation S350 to operation S390 illustrated in FIG. 10 may be performed. In operation S550, the storage controller 100 sets a promotion bit to 1 in the case of the read-after-read and clears the promotion bit to 0 in the case of the read-after-prefetch. In operation S560, the storage controller 100 transmits data to the host 300.

Figure 13:
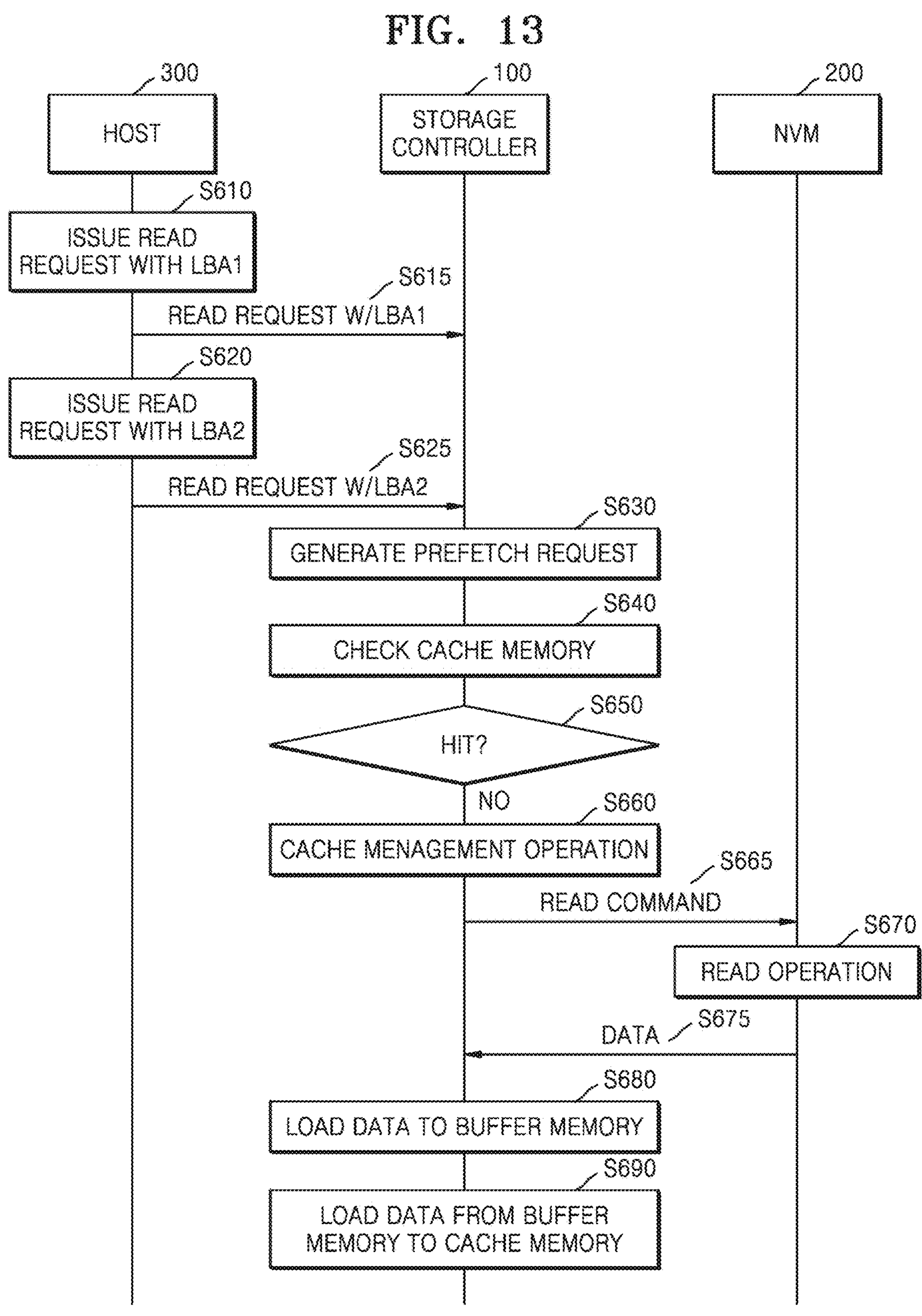
FIG. 13 is a flowchart showing an operation between a host, a storage controller, and non-volatile memory, according to some example embodiments.

FIG. 13 is a flowchart showing an operation between the host 300, the storage controller 100, and the NVM 200, according to some example embodiments.

Referring to FIG. 13, the operation according to the present example embodiments may correspond to an example of a prefetch operation. In operation S610, the host 300 issues a read request including a first LBA LBA1. In operation S615, the host 300 transmits the read request including the first LBA LBA1 to the storage controller 100. In operation S620, the host 300 issues a read request including a second LBA LBA2. In operation S625, the host 300 transmits the read request including the second LBA LBA2 to the storage controller 100. In this case, the first and second LBAs LBA1 and LBA2 may be consecutive addresses.

In operation S630, the storage controller 100 generates a prefetch request. In an example embodiment, the storage controller 100 may generate a prefetch request when a predetermined time elapses from a time point at which the read request is received in operation S625. In some example embodiments, operations of receiving a plurality of read requests may be further included between operation S625 and operation S630. In some example embodiments, the storage controller 100 may generate a prefetch request when k or more read requests respectively corresponding to consecutive logical addresses are received. For example, k may be a positive integer of 2 or more and may be variously changed according to an example embodiment.

In operation S640, the storage controller 100 checks the cache memory 150 in order to check whether data corresponding to the prefetch request exists in the cache memory 150. In operation S650, the storage controller 100 determines whether a cache hit has occurred. As a result of the determination, when the cache hit does not occur, that is, when a cache hit occurs, in operation S660, the storage controller 100 may perform a cache management operation. For example, the cache management operation may include at least one of operation S230 to operation S270 of FIG. 9. For example, the cache management operation may include at least one of operation S350 to operation S380 of FIG. 10.

Meanwhile, as a result of the determination, when the cache hit occurs, the cache controller 140 may generate a response indicating the cache hit and may transmit the generated response to the host I/F 120.

In operation S665, the storage controller 100 transmits a read command to the NVM 200. In operation S670, the NVM 200 performs a read operation in response to the read command. In operation S675, the NVM 200 transmits data to the storage controller 100. In operation S680, the storage controller 100 loads the data to the buffer memory 160. In operation S690, the storage controller 100 loads the data from the buffer memory 160 to the cache memory 150.

Figure 14:
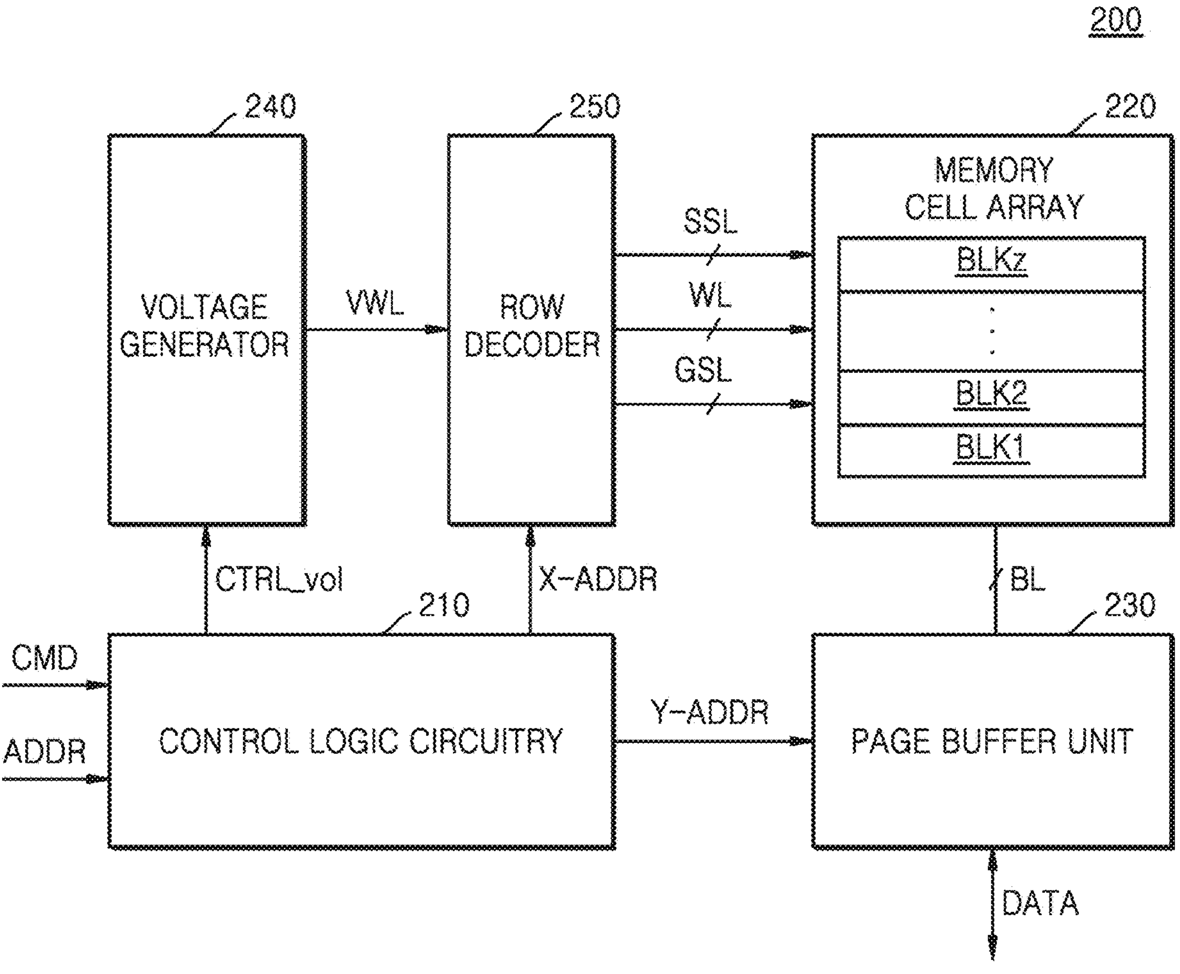
FIG. 14 is a block diagram of non-volatile memory according to some example embodiments.

FIG. 14 is a block diagram of the NVM 200 according to some example embodiments.

Referring to FIG. 14, the NVM 200 may include a control logic circuitry 210, a memory cell array 220, a page buffer unit 230, a voltage generator 240, and a row decoder 250. Although not shown in FIG. 14, the NVM 200 may further include a memory interface circuit and may also further include column logic, a pre-decoder, a temperature sensor, a command decoder, and an address decoder.

The control logic circuitry 210 may generally control various operations within the NVM 200. The control logic circuitry 210 may output various control signals in response to, for example, a command CMD and/or an address ADDR, received from the storage controller 100. For example, the control logic circuitry 210 may output a voltage control signal CTRL_vol, a row address X-ADDR, and/or a column address Y-ADDR.

The memory cell array 220 may include a plurality of memory blocks BLK1 to BLKZ (wherein z is a positive integer), and each of the plurality of memory blocks BLK1 to BLKz may include a plurality of memory cells. The memory cell array 220 may be connected to the page buffer unit 230 through bit lines BL and may be connected to the row decoder 250 through word lines WL, the string select lines SSL, and ground select lines GSL.

In some example embodiments, the memory cell array 220 may include a three-dimensional memory cell array, and the three-dimensional memory cell array may include a plurality of NAND strings. Each of the NAND strings may include memory cells respectively connected to word lines vertically stacked on a substrate. U.S. Pat. Nos. 7,679,133, 8,553,466, 8,654,587, 8,559,235, and U.S. Patent Application Publication No. 2011/0233648 are incorporated herein by reference. In some example embodiments, the memory cell array 220 may include a two-dimensional memory cell array, and the two-dimensional memory cell array may include a plurality of NAND strings arranged in row and column directions.

The page buffer unit 230 may include a plurality of page buffers PB1 to PBm (wherein m is an integer of 3 or more), and the plurality of page buffers PB1 to PBm may be respectively connected with memory cells through the bit lines BL. The page buffer unit 230 may select at least one bit line among the bit lines BL in response to the column address Y-ADDR. The page buffer unit 230 may operate as a write driver or a sense amplifier according to an operation mode. For example, during a program operation, the page buffer unit 230 may apply a bit line voltage corresponding to data to be programmed to a selected bit line. During a read operation, the page buffer unit 230 may sense data stored in a memory cell by sensing a current or voltage of a selected bit line.

The voltage generator 240 may generate various types of voltages for performing program, read, and/or erase operations based on the voltage control signal CTRL_vol. For example, the voltage generator 240 may generate a program voltage, a read voltage, a program verify voltage, an erase voltage, or the like as a word line voltage VWL.

The row decoder 250 may select one of the word lines WL and may select one of the string select lines SSL, in response to the row address X-ADDR. For example, the row decoder 250 may apply a program voltage and a program verify voltage to the selected word line during a program operation and may apply a read voltage to the selected word line during a read operation.

Referring to both FIGS. 1 and 14, the memory cell array 220 may store data corresponding to a read request received from the host 300 or a prefetch request issued from the storage controller 100. When receiving a read request or a read command from the storage controller 100, the NVM 200 may perform a read operation in response to the read request or the read command and may transmit data obtained as a result of performing the read operation to the storage controller 100.

Figure 15:
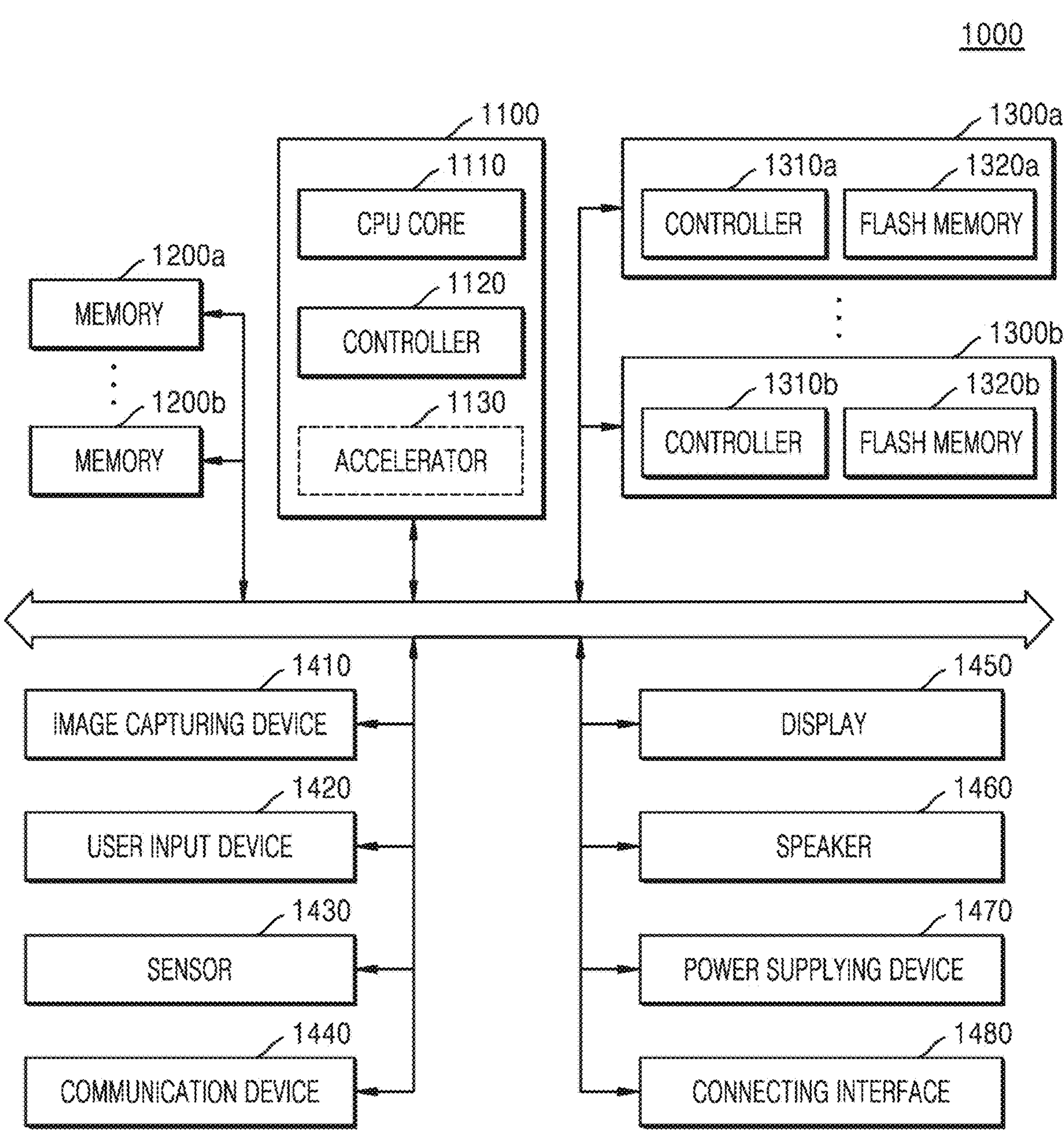
FIG. 15 shows a system in which a storage device is applied, according to some example embodiments.

FIG. 15 is a diagram of a system 1000 to which a storage device is applied, according to some example embodiments. The system 1000 of FIG. 15 may basically be a mobile system, such as a portable communication terminal (e.g., a mobile phone), a smartphone, a tablet personal computer (PC), a wearable device, a healthcare device, or an Internet of things (IOT) device. However, the system 1000 of FIG. 15 is not necessarily limited to the mobile system and may be a PC, a laptop computer, a server, a media player, or an automotive device (e.g., a navigation device).

Referring to FIG. 15, the system 1000 may include a main processor 1100, memories (e.g., 1200*a* and 1200*b*), and storage devices (e.g., 1300*a* and 1300*b*). In addition, the system 1000 may include at least one of an image capturing device 1410, a user input device 1420, a sensor 1430, a communication device 1440, a display 1450, a speaker 1460, a power supplying device 1470, and/or a connecting interface 1480.

The main processor 1100 may control all operations of the system 1000, more specifically, operations of other components included in the system 1000. The main processor 1100 may be implemented as a general-purpose processor, a dedicated processor, or an application processor.

The main processor 1100 may include at least one CPU core 1110 and further include a controller 1120 configured to control the memories 1200*a* and 1200*b* and/or the storage devices 1300*a* and 1300*b*. In some example embodiments, the main processor 1100 may further include an accelerator 1130, which is a dedicated circuit for a high-speed data operation, such as an artificial intelligence (AI) data operation. The accelerator 1130 may include a graphics processing unit (GPU), a neural processing unit (NPU) and/or a data processing unit (DPU) and be implemented as a chip that is physically separate from the other components of the main processor 1100.

The memories 1200*a* and 1200*b* may be used as main memory devices of the system 1000. Although each of the memories 1200*a* and 1200*b* may include volatile memory, such as static random access memory (SRAM) and/or dynamic RAM (DRAM), each of the memories 1200*a* and 1200*b* may include non-volatile memory, such as flash memory, phase-change RAM (PRAM) and/or resistive RAM (RRAM). The memories 1200*a* and 1200*b* may be implemented in the same package as the main processor 1100.

The storage devices 1300*a* and 1300*b* may serve as non-volatile storage devices configured to store data regardless of whether power is supplied thereto, and have larger storage capacity than the memories 1200*a* and 1200*b*. The storage device 1300*a* may include a storage controller 1310*a* and an NVM 1320*a*, and the storage device 1300*b* may include a storage controller 1310*b* and an NVM 1320*b*, wherein the NVMs 1320*a* and 1320*b* are configured to store data under control by the storage controllers 1310*a* and 1310*b*, respectively. Although the NVMs 1320*a* and 1320*b* may include flash memory having a 2D structure or a 3D V-NAND structure, the NVMs 1320*a* and 1320*b* may include other types of NVM, such as PRAM and/or RRAM.

The storage devices 1300*a* and 1300*b* may be physically separated from the main processor 1100 and included in the system 1000 or implemented in the same package as the main processor 1100. In addition, the storage devices 1300*a* and 1300*b* may have types of SSDs or memory cards and be removably combined with other components of the system 100 through an interface, such as the connecting interface 1480 that will be described below. The storage devices 1300*a* and 1300*b* may be devices to which a standard protocol, such as a UFS, an eMMC, or an NVMe, is applied, without being limited thereto.

The image capturing device 1410 may capture still images or moving images. The image capturing device 1410 may include a camera, a camcorder, and/or a webcam.

The user input device 1420 may receive various types of data input by a user of the system 1000 and include a touch pad, a keypad, a keyboard, a mouse, and/or a microphone.

The sensor 1430 may detect various types of physical quantities, which may be obtained from the outside of the system 1000, and convert the detected physical quantities into electric signals. The sensor 1430 may include a temperature sensor, a pressure sensor, an illuminance sensor, a position sensor, an acceleration sensor, a biosensor, and/or a gyroscope sensor.

The communication device 1440 may transmit and receive signals between other devices outside the system 1000 according to various communication protocols. The communication device 1440 may include an antenna, a transceiver, and/or a modem.

The display 1450 and the speaker 1460 may serve as output devices configured to respectively output visual information and auditory information to the user of the system 1000.

The power supplying device 1470 may appropriately convert power supplied from a battery (not shown) embedded in the system 1000 and/or an external power source, and supply the converted power to each of components of the system 1000.

The connecting interface 1480 may provide connection between the system 1000 and an external device, which is connected to the system 1000 and capable of transmitting and receiving data to and from the system 1000. The connecting interface 1480 may be implemented by using various interface schemes, such as advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, a universal serial bus (USB) interface, a secure digital (SD) card interface, a multi-media card (MMC) interface, an eMMC interface, a UFS interface, an embedded UFS (cUFS) interface, and/or a compact flash (CF) card interface.

Any of the elements and/or functional blocks disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

While the inventive concept has been particularly shown and described with reference to example embodiments thereof, it will be understood that various changes in form and details may be made therein without departing from the spirit and scope of the following claims. No example embodiment is necessarily mutually exclusive with any other example embodiment. For example, some example embodiments may include features described with reference to one or more figures.

What is claimed is:

1. A storage controller comprising:

a host interface configured to communicate with a host;

a buffer memory configured to buffer data read from a non-volatile memory;

a cache memory including a plurality of cache lines and configured to store the data in at least one of the plurality of cache lines; and a cache controller configured to manage a status bitmap, the status bitmap indicating priority information of the plurality of cache lines according to an operation corresponding to a request received from the host interface, and the cache controller further configured to select a victim cache line, among the plurality of cache lines, to be replaced based on the status bitmap, wherein the cache controller is further configured to set a priority of a cache line differently depending on whether the operation corresponds to a normal read, a prefetch, a read-after-read, or a read-after-prefetch, the read-after-prefetch being a case in which data corresponding to a read request received from the host corresponds to data prefetched by a prefetch request previously issued from the host interface, and wherein the cache controller is further configured to set a priority of a first cache line corresponding to the prefetch or the read-after-read higher than a priority of a second cache line corresponding to the normal read or the read-after-prefetch, such that the second cache line is selected as the victim cache line prior to the first cache line.

2. The storage controller of claim 1, wherein the status bitmap includes a promotion bitmap for setting the priority, the promotion bitmap includes a plurality of promotion bits corresponding to the plurality of cache lines, and the cache controller is further configured to select the victim cache line based on the plurality of promotion bits.

3. The storage controller of claim 2, wherein the cache controller is further configured to set a first promotion bit of the plurality of promotion bits corresponding to the first cache line having a high reusability among the plurality of cache lines, to 1, and clear a second promotion bit of the plurality of promotion bits corresponding to the second cache line having a lower reusability than that of the first cache line among the plurality of cache lines, to 0.

4. The storage controller of claim 2, wherein the cache controller is further configured to set a promotion bit of the plurality of promotion bits to 1 in response to the operation corresponding to the prefetch or the read-after-read, and clear the promotion bit to 0 in response to the operation corresponding to the read-after-prefetch.

5. The storage controller of claim 2, wherein the status bitmap further includes a prefetch bitmap for indicating whether there is the prefetch, the prefetch bitmap comprises a plurality of prefetch bits corresponding to the plurality of cache lines, and the cache controller is further configured to set a prefetch bit to 1 when the operation corresponds to the prefetch.

6. The storage controller of claim 2, wherein the status bitmap further includes a valid bitmap, the valid bitmap comprises a plurality of valid bits corresponding to the plurality of cache lines, and the cache controller is further configured to set a valid bit to 1 in response to the operation corresponding to the normal read or the prefetch.

7. The storage controller of claim 2, wherein the status bitmap further comprises a done bitmap, the done bitmap comprises a plurality of done bits corresponding to the plurality of cache lines, and the cache controller is further configured to set a done bit to 1 in response to data transmission to the host being completed by the normal read, the read-after-read, or the read-after-prefetch, and set the done bit to 1 in response to data loading to the buffer memory being completed by the prefetch.

8. The storage controller of claim 2, wherein the cache controller comprises:

a victim condition composition unit configured to reconfigure the status bitmap according to the operation;

a victim cache line selection unit configured to select, as the victim cache line, a cache line having a low priority among the plurality of cache lines according to the status bitmap; and a downgrade unit configured to downgrade one or more promotion bits included in the status bitmap, to 0.

9. The storage controller of claim 8, wherein the victim condition composition unit is further configured to reconfigure the status bitmap in response to the operation corresponding to the normal read or the prefetch to determine a reconfigured status bitmap, and calculate victim candidates selectable as the victim cache line from the reconfigured status bitmap.

10. The storage controller of claim 8, wherein the status bitmap comprises a promotion bit and a done bit corresponding to each of the plurality of cache lines, and the victim condition composition unit is further configured to output a victim condition value from a result of calculating the promotion bit and the done bit.

11. The storage controller of claim 10, wherein the victim condition value is generated from an AND operation applied to the done bit and the result of a NOT operation applied to the promotion bit.

12. The storage controller of claim 10, wherein the victim cache line selection unit is further configured to search for victim condition values corresponding to the plurality of cache lines, and the victim cache line selection unit is further configured to start from a current pointer, and select a new victim cache line that first satisfies a victim condition after the current pointer.

13. The storage controller of claim 12, wherein the victim cache line selection unit is further configured to update the current pointer to a previous pointer, and update an index of the victim cache line to a new current pointer.

14. The storage controller of claim 13, wherein the downgrade unit is further configured to downgrade promotion bits between the previous pointer and the new current pointer, to 0.

15. The storage controller of claim 2, wherein the cache controller is further configured to in response to the cache controller receiving a request from the host, determine whether a cache hit has occurred, in response to determining that a cache hit has occurred, determine whether an operation corresponding to the request corresponds to the read-after-read;

in response to determining that the operation corresponding to the request corresponds to the read-after-read, set a promotion bit of the plurality of promotion bits to 1, and in response to determining that the operation corresponding to the request is a read-after-prefetch, clear the promotion bit to 0.

16. A storage device comprising:

a non-volatile memory; and a storage controller configured to control the non-volatile memory, wherein the storage controller includes, a host interface configured to communicate with a host;

a buffer memory configured to buffer data read from the non-volatile memory;

a cache memory including a plurality of cache lines and configured to store the data in at least one of the plurality of cache lines; and a cache controller configured to manage a status bitmap, the status bitmap indicating priority information of the plurality of cache lines according to an operation corresponding to a request received from the host interface, and the cache controller further configured to select a victim cache line, among the plurality of cache lines, to be replaced based on the status bitmap, wherein the cache controller is further configured to set a priority of a cache line differently depending on whether the operation corresponds to a normal read, a prefetch, a read-after-read, or a read-after-prefetch, the read-after-prefetch being a case in which data corresponding to a read request received from the host corresponds to data prefetched by a prefetch request previously issued from the host interface, and wherein the cache controller is further configured to set a priority of a first cache line corresponding to the prefetch or the read-after-read higher than a priority of a second cache line corresponding to the normal read or the read-after-prefetch, such that the second cache line is selected as the victim cache line prior to the first cache line.

* * * * *